US012777258B2

(12) United States Patent
Wada

(10) Patent No.: US 12,777,258 B2
(45) Date of Patent: Oct. 27, 2026

(54) IMAGING SUPPORT DEVICE, IMAGING DEVICE, IMAGING SUPPORT METHOD, AND PROGRAM

(71) Applicant: FUJIFILM Corporation, Tokyo (JP)

(72) Inventor: Tetsu Wada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 55 days.

(21) Appl. No.: 19/050,119

(22) Filed: Feb. 11, 2025

(65) Prior Publication Data

US 2025/0184613 A1 Jun. 5, 2025

Related U.S. Application Data

(63) Continuation of application No. PCT/JP2023/017456, filed on May 9, 2023.

(30) Foreign Application Priority Data

Aug. 16, 2022 (JP) ................................ 2022-129663

(51) Int. Cl.
*H04N 23/73* (2023.01)
*H04N 23/68* (2023.01)

(52) U.S. Cl.
CPC ......... *H04N 23/73* (2023.01); *H04N 23/6811* (2023.01); *H04N 23/683* (2023.01)

(58) Field of Classification Search
CPC .. H04N 23/73; H04N 23/6811; H04N 23/683; H04N 5/222; H04N 23/60;
(Continued)

(56) References Cited

U.S. PATENT DOCUMENTS

2005/0225645 A1* 10/2005 Kaku ........................ G06T 5/73 348/208.99
2012/0197079 A1* 8/2012 Kuriyama .......... G02B 23/2476 600/109

(Continued)

FOREIGN PATENT DOCUMENTS

JP 2014191126 10/2014
JP 2017085551 5/2017

(Continued)

OTHER PUBLICATIONS

"International Search Report (Form PCT/ISA/210) of PCT/JP2023/017456," mailed on Jun. 20, 2023, with English translation thereof, pp. 1-5.

(Continued)

*Primary Examiner* — Hung H Lam
(74) *Attorney, Agent, or Firm* — JCIPRNET

(57) ABSTRACT

An imaging support device is an imaging support device that supports imaging performed by an imaging device mounted in a moving object. The imaging device includes an image sensor. The imaging support device includes a processor. The processor derives a shake amount that is allowable for a subject image formed on the image sensor in a state in which the moving object is moving, based on a dimension of a specific part included in a subject and pixel resolution, and derives an exposure time for the image sensor based on a moving speed of the moving object and the shake amount.

14 Claims, 16 Drawing Sheets

(58) Field of Classification Search
CPC ...... H04N 23/68; H04N 23/687; H04N 23/69; G03B 7/093; G03B 15/00
See application file for complete search history.

(56) References Cited

U.S. PATENT DOCUMENTS

| | | | | |
|---|---|---|---|---|
| 2017/0078553 | A1 | 3/2017 | Sron et al. | |
| 2018/0239938 | A1 | 8/2018 | Nagata et al. | |
| 2019/0188437 | A1 | 6/2019 | Nagata et al. | |
| 2020/0137284 | A1* | 4/2020 | Masuda | H04N 23/63 |
| 2020/0236284 | A1* | 7/2020 | Miyazawa | H04N 23/6812 |
| 2021/0266446 | A1* | 8/2021 | Saito | H04N 25/535 |
| 2022/0141371 | A1 | 5/2022 | Ietomi et al. | |
| 2024/0276099 | A1* | 8/2024 | Matsui | G03B 15/00 |
| 2024/0342920 | A1* | 10/2024 | Horie | B25J 19/023 |
| 2025/0350836 | A1* | 11/2025 | Matsui | G03B 5/00 |

FOREIGN PATENT DOCUMENTS

| | | |
|---|---|---|
| JP | 2017204835 | 11/2017 |
| JP | 2020050261 | 4/2020 |
| JP | 2021027409 | 2/2021 |
| JP | 2021144733 | 9/2021 |

OTHER PUBLICATIONS

"Written Opinion of the International Searching Authority (Form PCT/ISA/237) of PCT/JP2023/017456," mailed on Jun. 20, 2023, with English translation thereof, pp. 1-6.

* cited by examiner

IMAGING SUPPORT DEVICE, IMAGING DEVICE, IMAGING SUPPORT METHOD, AND PROGRAM

This application is a continuation application of International Application No. PCT/JP2023/017456, filed May 9, 2023, the disclosure of which is incorporated herein by reference in its entirety. Further, this application claims priority under 35 USC 119 from Japanese Patent Application No. 2022-129663 filed Aug. 16, 2022, the disclosure of which is incorporated by reference herein.

BACKGROUND OF THE INVENTION

1. Field of the Invention

The present disclosed technology relates to an imaging support device, an imaging device, an imaging support method, and a program.

2. Description of the Related Art

JP2017-085551A describes a method of dynamically deciding on an exposure time for capturing an image, which is performed by a drone having a substantially vertical-looking camera. The method described in JP2017-085551A comprises a step of measuring a horizontal displacement speed of the drone, a step of measuring a distance between the drone and the ground, and a step of deciding on the exposure time based on the measured displacement speed of the drone, the measured distance between the drone and the ground, a predetermined blurring amount, and a focal length of the camera.

JP2021-144733A describes an optical information reading device comprising an imaging unit, an input unit, a distance setting unit, a characteristic information storage unit, a cell size setting unit, an imaging condition setting unit, and a decoding unit. The imaging unit includes an imaging element that images a code attached to a workpiece that moves. The input unit inputs a moving speed of the workpiece. The distance setting unit obtains a distance from the imaging unit to the code. The characteristic information storage unit stores characteristic information for defining a visual field range of the imaging unit in accordance with the distance from the imaging unit to the code. The cell size setting unit calculates and sets a size of a cell of the code based on the code included in the image captured by the imaging unit, the distance obtained by the distance setting unit, and specific information stored in the characteristic information storage unit. The imaging condition setting unit obtains an upper limit value of an exposure time of the imaging unit as a condition for reading the code attached to the workpiece based on the moving speed of the workpiece input by the input unit and the size of the cell set by the cell size setting unit, to set the exposure time of the imaging unit within a range equal to or less than the upper limit value. The decoding unit decodes a code included in an image newly acquired by the imaging unit by using the exposure time set by the imaging condition setting unit.

JP2021-027409A describes a control device comprising a circuit configured to set an upper limit value of an exposure time and to decide on an exposure time of an imaging device within a range equal to or less than the upper limit value based on an exposure control value of the imaging device.

SUMMARY OF THE INVENTION

One embodiment according to the present disclosed technology provides, as an example, an imaging support device, an imaging device, an imaging method, and a program that can set an exposure time suitable for a dimension of a specific part included in a subject, as compared to a case in which the exposure time is set regardless of the dimension of the specific part.

A first aspect according to the present disclosed technology provides an imaging support device that supports imaging performed by an imaging device mounted in a moving object and including an image sensor, the imaging support device comprising: a processor, in which the processor derives a shake amount that is allowable for a subject image formed on the image sensor in a state in which the moving object is moving, based on a dimension of a specific part included in a subject and pixel resolution, and derives an exposure time for the image sensor based on a moving speed of the moving object and the shake amount.

A second aspect according to the present disclosed technology provides the imaging support device according to the first aspect, in which the imaging device further includes an imaging lens, and the pixel resolution is pixel resolution determined based on a pixel pitch of the image sensor, a focal length of the imaging lens, and an imaging distance between the subject and the imaging device.

A third aspect according to the present disclosed technology provides the imaging support device according to the first aspect, in which the imaging device further includes an imaging lens, and the processor derives a recommended focal length that is recommended for the imaging lens, based on the dimension, a pixel pitch of the image sensor, and an imaging distance between the subject and the imaging device.

A fourth aspect according to the present disclosed technology provides the imaging support device according to the third aspect, in which a focal length of the imaging lens is a focal length set based on the recommended focal length.

A fifth aspect according to the present disclosed technology provides the imaging support device according to the third or fourth aspect, in which the imaging lens is a zoom lens.

A sixth aspect according to the present disclosed technology provides the imaging support device according to the third or fourth aspect, in which the imaging lens is a fixed focus lens.

A seventh aspect according to the present disclosed technology provides the imaging support device according to any one of the first to fourth aspects, in which the imaging device further includes a zoom lens, the processor derives a target focal length that is targeted for the zoom lens, based on the dimension, a pixel pitch of the image sensor, and an imaging distance between the subject and the imaging device, and a focal length of the zoom lens is set to the target focal length by performing zoom control of moving the zoom lens.

An eighth aspect according to the present disclosed technology provides the imaging support device according to the first aspect, in which the imaging device further includes an imaging lens, and the shake amount is derived based on a blurriness amount of the imaging lens.

A ninth aspect according to the present disclosed technology provides the imaging support device according to the eighth aspect, in which the blurriness amount is determined based on an allowable confusion circle diameter.

A tenth aspect according to the present disclosed technology provides the imaging support device according to any one of the first to ninth aspects, in which the specific part is a defective part.

An eleventh aspect according to the present disclosed technology provides the imaging support device according to the tenth aspect, in which the defective part is a crack, and the dimension is a width dimension.

A twelfth aspect according to the present disclosed technology provides an imaging device mounted in a moving object, the imaging device comprising: an image sensor; and a processor, in which the processor derives a shake amount that is allowable for a subject image formed on the image sensor in a state in which the moving object is moving, based on a dimension of a specific part included in a subject and pixel resolution, and derives an exposure time for the image sensor based on a moving speed of the moving object and the shake amount.

A thirteenth aspect according to the present disclosed technology provides an imaging support method of supporting imaging performed by an imaging device mounted in a moving object and including an image sensor, the imaging support method comprising: deriving a shake amount that is allowable for a subject image formed on the image sensor in a state in which the moving object is moving, based on a dimension of a specific part included in a subject and pixel resolution; and deriving an exposure time for the image sensor based on a moving speed of the moving object and the shake amount.

A fourteenth aspect according to the present disclosed technology provides a program for causing a computer applied to an imaging support device that supports imaging performed by an imaging device mounted in a moving object and including an image sensor, to execute a process comprising: deriving a shake amount that is allowable for a subject image formed on the image sensor in a state in which the moving object is moving, based on a dimension of a specific part included in a subject and pixel resolution; and deriving an exposure time for the image sensor based on a moving speed of the moving object and the shake amount.

DESCRIPTION OF THE PREFERRED EMBODIMENTS

Figure 1:
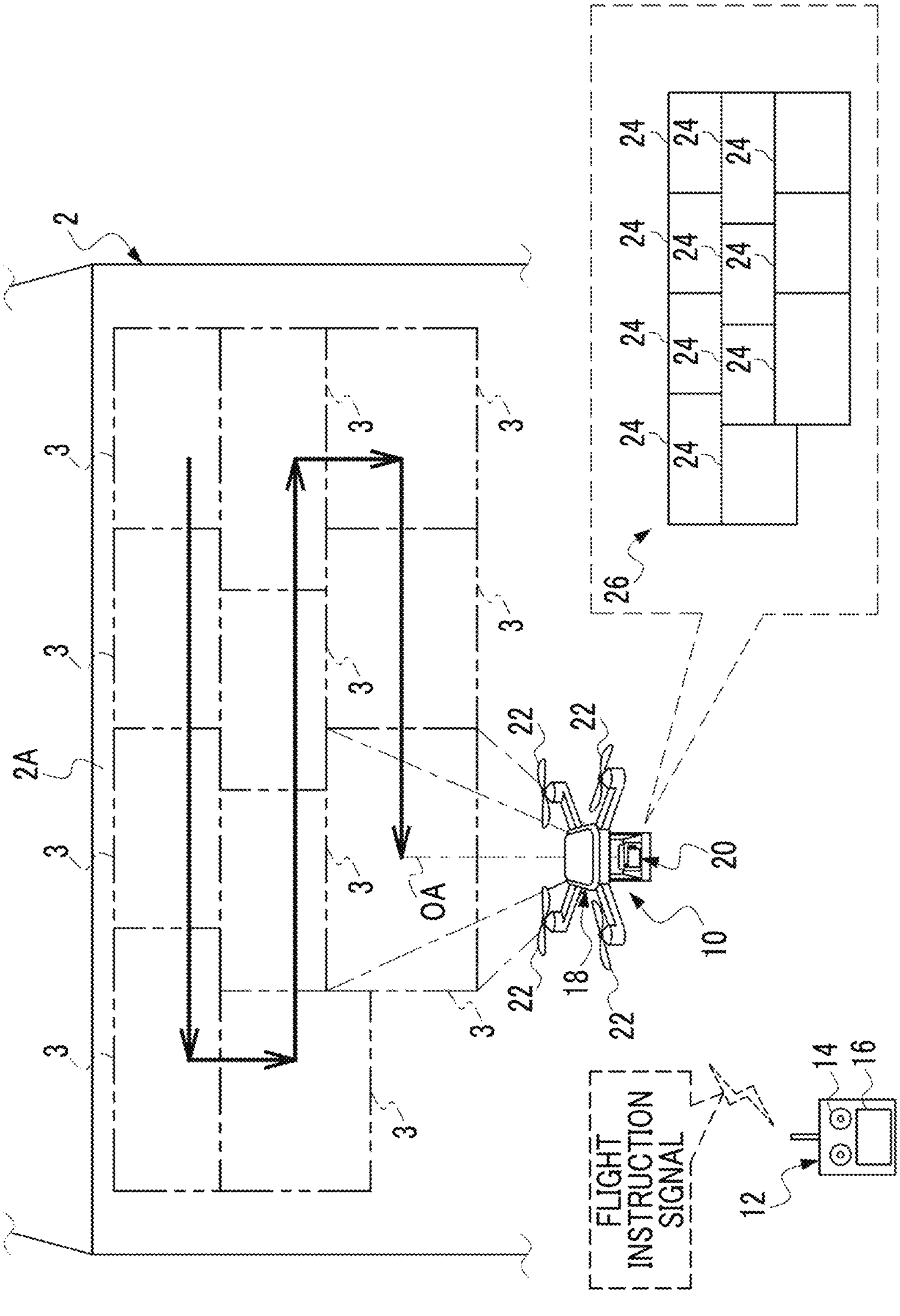
FIG. 1 is a front view showing an example of an aspect in which a plurality of imaging target regions are imaged in sequence by a flight imaging device.

Hereinafter, an example of an embodiment of an imaging support device, an imaging device, an imaging support method, and a program according to the present disclosed technology will be described with reference to accompanying drawings.

First, the terms used in the following description will be described.

I/F is an abbreviation for "interface". RAM is an abbreviation for "random access memory". CPU is an abbreviation for "central processing unit". GPU is an abbreviation for "graphics processing unit". HDD is an abbreviation for "hard disk drive". SSD is an abbreviation for "solid-state drive". DRAM is an abbreviation for "dynamic random access memory". SRAM is an abbreviation for "static random access memory". NVM is an abbreviation for "non-volatile memory". ASIC is an abbreviation for "application-specific integrated circuit". FPGA is an abbreviation for "field-programmable gate array". PLD is an abbreviation for "programmable logic device". CMOS is an abbreviation for "complementary metal-oxide-semiconductor". CCD is an abbreviation for "charge-coupled device". ISO is an abbreviation for "international organization for standardization". TPU is an abbreviation for "tensor processing unit". USB is an abbreviation for "Universal Serial Bus". SoC is an abbreviation for "system-on-a-chip". IC is an abbreviation for "integrated circuit".

In the description of the present specification, the term "constant" refers to constant in the sense of including an error generally allowed in the technical field to which the present disclosed technology belongs, that is, an error to the extent that it does not contradict the gist of the present disclosed technology, in addition to the exact constant. The term "perpendicular" refers to perpendicularity in the sense of including an error generally allowed in the technical field to which the present disclosed technology belongs, that is, an error to the extent that it does not contradict the gist of the present disclosed technology, in addition to the exact perpendicularity. In the description of the present specification, the term "horizontal direction" refers to a horizontal direction in the sense of including an error generally allowed in the technical field to which the present disclosed technology belongs, that is, an error to the extent that it does not contradict the gist of the present disclosed technology, in addition to the exact horizontal direction. In the description of the present specification, the term "vertical direction" refers to a vertical direction in the sense of including an error generally allowed in the technical field to which the present disclosed technology belongs, that is, an error to the extent that it does not contradict the gist of the present disclosed technology, in addition to the exact vertical direction. In the description of the present specification, the term "upper limit value" refers to an upper limit value in the sense of including an error generally allowed in the technical field to which the present disclosed technology belongs, that is, an error to the extent that it does not contradict the gist of the present disclosed technology, in addition to the exact upper limit value. In the description of the present specification, the term "lower limit value" refers to a lower limit value in the sense of including an error generally allowed in the technical field to which the present disclosed technology belongs, that is, an error to the extent that it does not contradict the gist of the present disclosed technology, in addition to the exact lower limit value.

As shown in FIG. 1 as an example, a flight imaging device 10 has a flight function and an imaging function, and images a wall surface 2A of a target object 2 while flying. As an example, the target object 2 having the wall surface 2A is a bridge pier provided in a bridge. The bridge pier is made of, for example, reinforced concrete. Here, although the bridge pier is described as an example of the target object 2, the target object 2 may be an object (for example, a tunnel or a dam) other than the bridge pier.

The flight function of the flight imaging device 10 is a function of the flight imaging device 10 flying based on a flight instruction signal. The flight instruction signal refers to a signal for instructing the flight imaging device 10 to fly. The flight instruction signal is transmitted from, for example, a transmitter 12 for controlling the flight imaging device 10. The transmitter 12 is operated by a user (not shown) or the like.

The transmitter 12 has a control lever 14 and a touch panel display 16. The control lever 14 is operable by the user or the like. The flight imaging device 10 transmits the flight instruction signal in response to the operation of the control lever 14 performed by the user or the like. The touch panel display 16 has a display function of displaying various images and/or information and a reception function of receiving an instruction from the user or the like.

It should be noted that the transmitter 12 may have a display device having the display function and a reception device having the reception function, instead of the touch panel display 16. Examples of the display device include a liquid crystal display. Examples of the reception device include an interface device having hard keys. In addition, here, although an example is described in which the flight instruction signal is transmitted from the transmitter 12, the flight instruction signal may be transmitted from a base station (not shown) or the like that sets a flight route for the flight imaging device 10.

The flight imaging device 10 comprises a flying object 18 and an imaging device 20. The flying object 18 is an unmanned aerial vehicle, such as a drone. The flight function of the flight imaging device 10 is implemented by the flying object 18. The flying object 18 includes a plurality of propellers 22, and flies by rotating the plurality of propellers 22. The flying of the flying object 18 is synonymous with the flying of the flight imaging device 10. The flying object 18 is an example of a "moving object" according to the present disclosed technology.

The imaging function of the flight imaging device 10 is a function of imaging a subject (for example, the wall surface 2A of the target object 2) via the flight imaging device 10. The imaging function of the flight imaging device 10 is implemented by the imaging device 20. The imaging device 20 is, for example, a digital camera or a video camera. The imaging device 20 is mounted in the flying object 18. The imaging device 20 is an example of an "imaging device" according to the present disclosed technology.

The flight imaging device 10 images, in sequence, a plurality of imaging target regions 3 of the wall surface 2A. The imaging target region 3 is a region determined by an angle of view of the flight imaging device 10. The example shown in FIG. 1 shows a quadrangular region as an example of the imaging target region 3. A plurality of images for combination 24 are obtained by imaging a plurality of imaging target regions 3 in sequence via the imaging device 20.

A composite image 26 is generated by combining the plurality of images for combination 24. The plurality of images for combination 24 are combined such that the adjacent images for combination 24 partially overlap each other. Examples of the composite image 26 include a two-dimensional panoramic image. The two-dimensional panoramic image is merely an example, and a three-dimensional image (for example, a three-dimensional panoramic image) may be generated as the composite image 26 in the same manner as how the two-dimensional panoramic image is generated as the composite image 26.

The composite image 26 may be generated each time the images for combination 24 for the second and subsequent frames are obtained, or may be generated after the plurality of images for combination 24 are obtained for the wall surface 2A. In addition, processing of generating the composite image 26 may be executed by the flight imaging device 10 or may be executed by a server device or the like (not shown) that is communicably connected to the flight imaging device 10. The composite image 26 is used for, for example, inspecting or measuring the wall surface 2A of the target object 2.

The example shown in FIG. 1 shows an aspect in which each imaging target region 3 is imaged by the imaging device 20 in a state in which an optical axis OA of the imaging device 20 is perpendicular to the wall surface 2A. Hereinafter, an example will be described in which each imaging target region 3 is imaged by the imaging device 20 in a state in which the optical axis OA of the imaging device 20 is perpendicular to the wall surface 2A.

The plurality of imaging target regions 3 are imaged such that the adjacent imaging target regions 3 partially overlap each other. The imaging of the plurality of imaging target regions 3 such that the adjacent imaging target regions 3 partially overlap each other is to combine the images for combination 24 corresponding to the adjacent imaging target regions 3 based on feature points included in the overlapping part of the adjacent imaging target regions 3.

Hereinafter, a case in which the adjacent imaging target regions 3 partially overlap each other and a case in which the adjacent images for combination 24 partially overlap each other may be referred to as "overlap". The flight imaging device 10 moves in a zigzag manner by alternately repeating movement in a horizontal direction and movement in a vertical direction as an example. As a result, the plurality of imaging target regions 3 that are connected in a zigzag manner are imaged in sequence.

Figure 2:
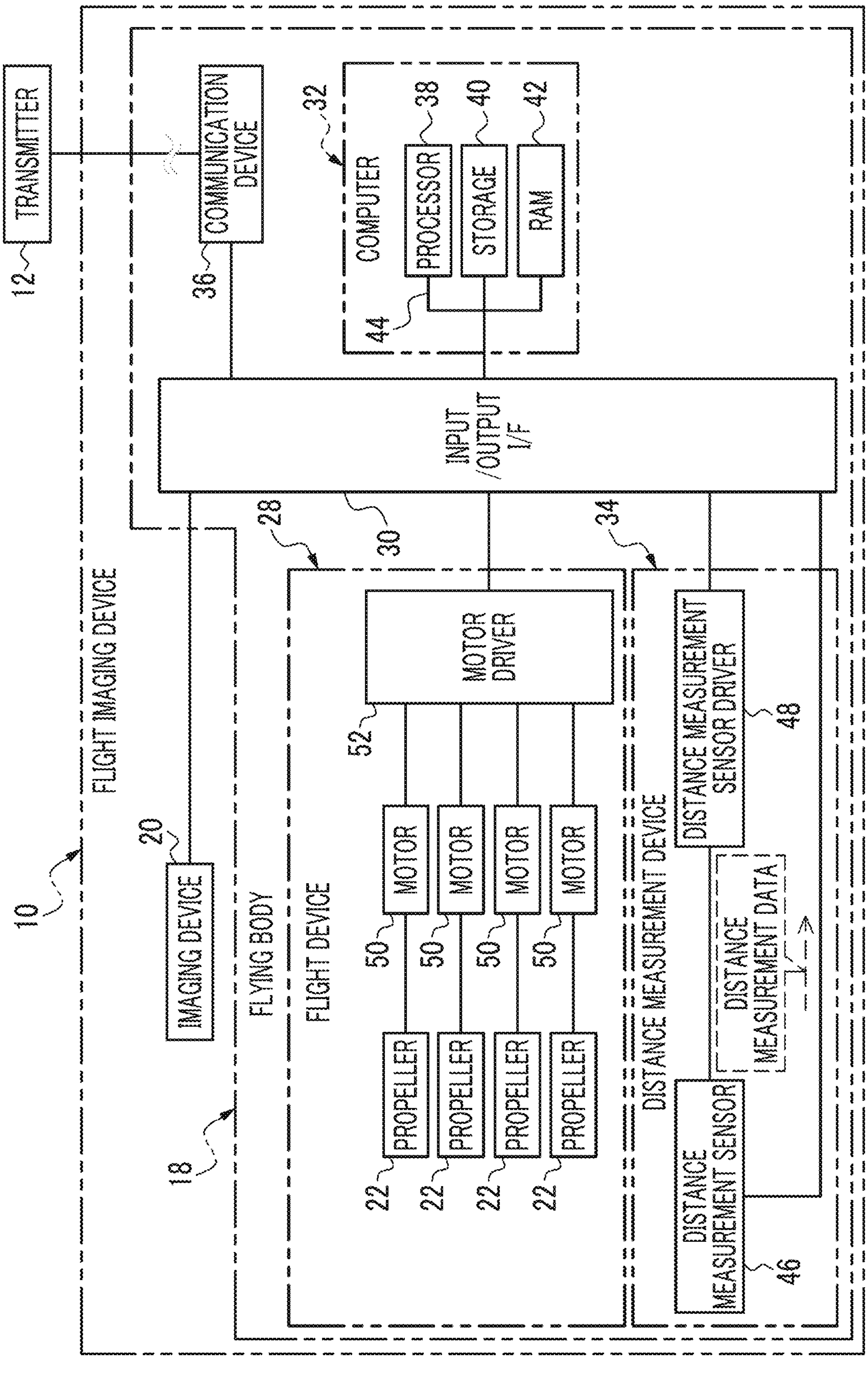
FIG. 2 is a block diagram showing an example of a hardware configuration of a flight imaging device.

As shown in FIG. 2 as an example, the flying object 18 comprises a flight device 28, an input/output I/F 30, a computer 32, a distance measurement device 34, and a communication device 36. The computer 32 is an example of a "imaging support device" and a "computer" according to the present disclosed technology.

The computer 32 comprises a processor 38, a storage 40, and a RAM 42. The processor 38, the storage 40, and the RAM 42 are connected to each other via a bus 44, and the bus 44 is connected to the input/output I/F 30.

The processor 38 includes, for example, a CPU and controls the entire flight imaging device 10. Here, an example is described in which the processor 38 includes the CPU, but this is merely an example. For example, the processor 38 may include a CPU and a GPU. In this case, for example, the GPU operates under control of the CPU, and is responsible for executing image processing. The processor 38 is an example of a "processor" according to the present disclosed technology.

The storage 40 is a nonvolatile storage device that stores various programs, various parameters, and the like. Examples of the storage 40 include an HDD and an SSD. In addition, the HDD and the SSD are merely examples, and a flash memory, a magnetoresistive memory, and/or a ferroelectric memory may be used instead of the HDD and/or the SSD or together with the HDD and/or the SSD.

The RAM 42 is a memory that stored stores the information and is used as a work memory by the processor 38. Examples of the RAM 42 include a DRAM and/or an SRAM.

The distance measurement device 34 comprises a distance measurement sensor 46 and a distance measurement sensor driver 48. The distance measurement sensor 46 is a sensor having a distance measurement function. The distance measurement function of the distance measurement sensor 46 is implemented by, for example, an ultrasound type distance measurement sensor, a laser type distance measurement sensor, or a radar type distance measurement sensor. The distance measurement sensor 46 and the distance measurement sensor driver 48 are connected to the processor 38 via the input/output I/F 30 and the bus 44. The distance measurement sensor driver 48 controls the distance measurement sensor 46 in response to an instruction from the processor 38.

The distance measurement sensor 46 measures a distance between the distance measurement sensor 46 and a distance measurement target object (for example, the wall surface 2A shown in FIG. 1) under the control of the distance measurement sensor driver 48, and outputs distance measurement data indicating the measured distance to the processor 38. It should be noted that, here, although the distance measurement device 34 that is independent of the imaging device 20 is used, an imaging device having a distance measurement function (for example, an imaging device having a phase difference pixel) may be used instead of the distance measurement device 34.

The communication device 36 is connected to the processor 38 via the input/output I/F 30 and the bus 44. Further, the communication device 36 is connected to the transmitter 12 via wired or wireless communication. The communication device 36 controls exchange of information with the transmitter 12. For example, the communication device 36 transmits data in response to a request from the processor 38 to the transmitter 12. Further, the communication device 36 receives the data transmitted from the transmitter 12 and outputs the received data to the processor 38 via the bus 44.

The flight device 28 includes the plurality of propellers 22, a plurality of motors 50, and a motor driver 52. The motor driver 52 is connected to the processor 38 via the input/output I/F 30 and the bus 44. The motor driver 52 individually controls the plurality of motors 50 in response to an instruction from the processor 38. The number of plurality of motors 50 is the same as the number of plurality of propellers 22.

The propeller 22 is fixed to a rotation shaft of each motor 50. Each motor 50 rotates the propeller 22. In a case in which the plurality of propellers 22 rotate, the flying object 18 flies. It should be noted that the number of plurality of propellers 22 (in other words, the number of plurality of motors 50) provided in the flying object 18 is four as an example, but this is merely an example, and the number of plurality of propellers 22 may be, for example, three or five or more.

Figure 3:
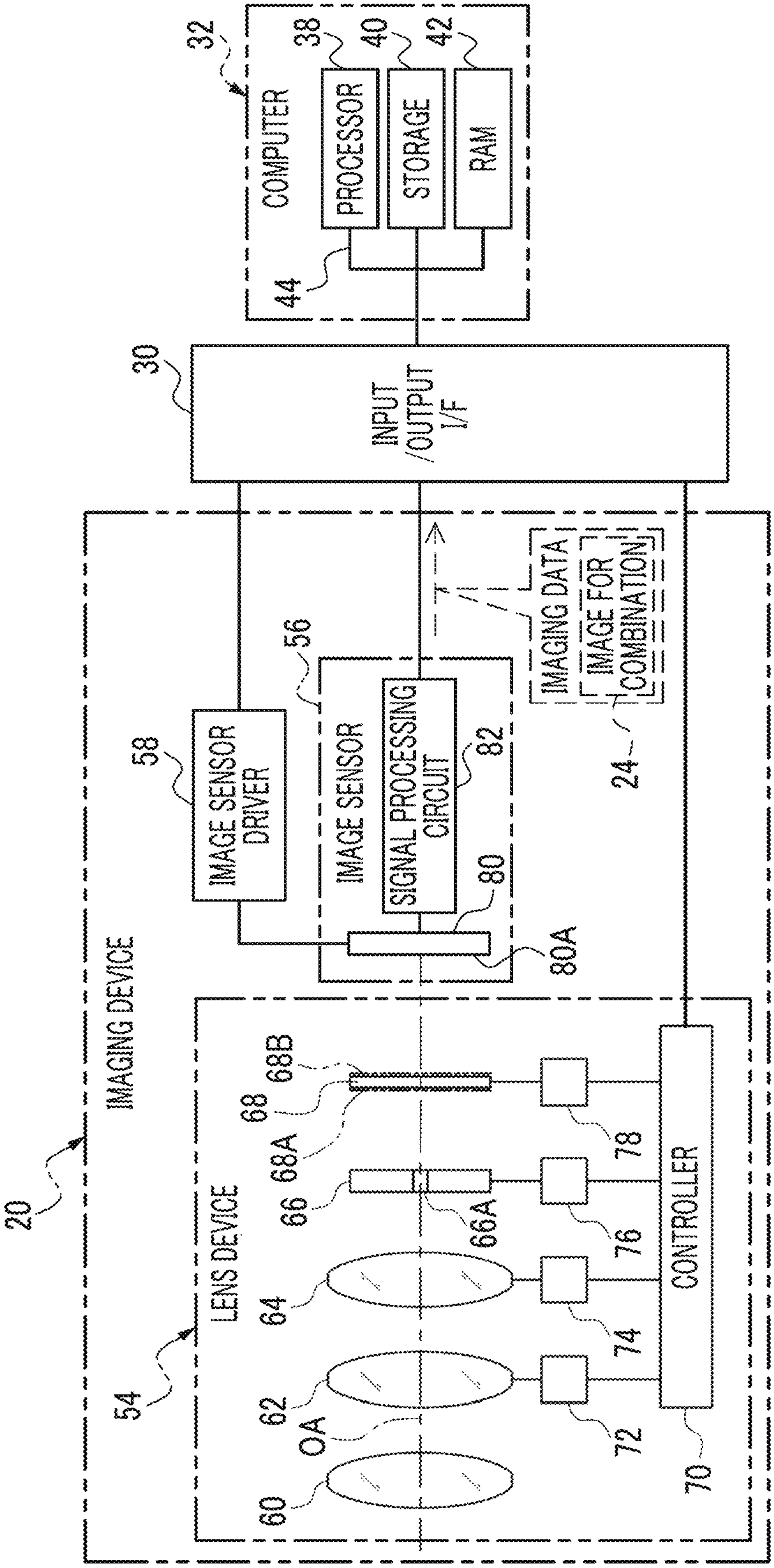
FIG. 3 is a block diagram showing a hardware configuration of an imaging device.

As shown in FIG. 3 as an example, the imaging device 20 comprises a lens device 54, an image sensor 56, and an image sensor driver 58.

The lens device 54 includes an objective lens 60, a focus lens 62, a zoom lens 64, a stop 66, and a mechanical shutter 68. The objective lens 60, the focus lens 62, the zoom lens 64, the stop 66, and the mechanical shutter 68 are disposed in an order of the objective lens 60, the focus lens 62, the zoom lens 64, the stop 66, and the mechanical shutter 68 along the optical axis OA of the imaging device 20 from the subject side to the image sensor 56 side. The zoom lens 64 is an example of an "imaging lens" and a "zoom lens" according to the present disclosed technology.

Further, the lens device 54 includes a controller 70, a focus actuator 72, a zoom actuator 74, a stop actuator 76, and a shutter actuator 78.

The controller 70 controls the focus actuator 72, the zoom actuator 74, the stop actuator 76, and the shutter actuator 78 in response to an instruction from the processor 38. The controller 70 is, for example, a device including a computer including a CPU, an NVM, and a RAM.

It should be noted that, here, the computer is described as an example, but this is merely an example, and a device including an ASIC, an FPGA, and/or a PLD may be applied. Further, as the controller 70, for example, a device implemented by a combination of a hardware configuration and a software configuration may be used.

The focus actuator 72 is connected to the focus lens 62. The focus actuator 72 includes a support mechanism (not shown) that supports the focus lens 62 to be movable along the optical axis OA, and a power source (not shown) that moves the focus lens 62 along the optical axis OA.

The zoom actuator 74 is connected to the zoom lens 64. The zoom actuator 74 includes a support mechanism (not shown) that supports the zoom lens 64 to be movable along the optical axis OA, and a power source (not shown) that moves the zoom lens 64 along the optical axis OA.

The stop 66 has an aperture 66A, and is configured to change a size of the aperture 66A. The stop 66 has a plurality of blades (not shown), and the aperture 66A is formed by the plurality of blades. The stop actuator 76 includes a power transmission mechanism (not shown) connected to the plurality of blades and a power source (not shown) that applies power to the power transmission mechanism. The stop actuator 76 changes the size of the aperture 66A by moving the plurality of blades. The stop 66 adjusts the exposure by changing the size of the aperture 66A.

The mechanical shutter 68 is, for example, a focal plane shutter. The mechanical shutter 68 comprises a front curtain 68A and a rear curtain 68B. For example, each of the front curtain 68A and the rear curtain 68B comprises a plurality of blades (not shown). The front curtain 68A is disposed on the subject side with respect to the rear curtain 68B.

The shutter actuator 78 includes a link mechanism (not shown), a solenoid for a front curtain (not shown), and a solenoid for a rear curtain (not shown). The solenoid for a front curtain is a drive source of the front curtain 68A, and is mechanically connected to the front curtain 68A via the link mechanism. The solenoid for a rear curtain is a drive source of the rear curtain 68B and is mechanically connected to the rear curtain 68B via the link mechanism.

The solenoid for a front curtain selectively performs winding-up and pulling-down of the front curtain 68A by applying the power to the front curtain 68A via the link mechanism. The solenoid for a rear curtain selectively performs winding-up and pulling-down of the rear curtain 68B by applying the power to the rear curtain 68B via the link mechanism. In the imaging device 20, an exposure amount to the image sensor 56 is adjusted by controlling the opening and closing of the front curtain 68A and the opening and closing of the rear curtain 68B. In addition, the exposure time (in other words, a shutter speed) for the image sensor 56 is defined depending on a time during which the front curtain 68A and the rear curtain 68B are opened.

It should be noted that, here, although the focal plane shutter is described as an example of the mechanical shutter 68, this is merely an example, and the mechanical shutter 68 may be a lens shutter. In addition, although an example is described in which the exposure time is defined by the mechanical shutter 68, this is merely an example. For example, the exposure time may be defined by an electronic shutter (for example, an electronic front curtain shutter or a fully electronic shutter).

The image sensor 56 comprises a photoelectric conversion element 80 and a signal processing circuit 82. The image sensor 56 is, for example, a CMOS image sensor. In the present embodiment, although the CMOS image sensor is described as the image sensor 56, the present disclosed technology is not limited to this, and, for example, the present disclosed technology is also established even in a case in which the image sensor 56 is another type of image sensor, such as a CCD image sensor. The image sensor 56 is an example of an "image sensor" according to the present disclosed technology.

The photoelectric conversion element 80 is connected to the image sensor driver 58. The image sensor driver 58 is connected to the processor 38 via the input/output I/F 30 and the bus 44. The image sensor driver 58 controls the photoelectric conversion element 80 in response to an instruction from the processor 38.

The photoelectric conversion element 80 has a light-receiving surface 80A provided with a plurality of pixels (not shown). The photoelectric conversion element 80 outputs an electric signal output from the plurality of pixels to the signal processing circuit 82 as imaging data. The signal processing circuit 82 digitizes analog imaging data input from the photoelectric conversion element 80. The signal processing circuit 82 is connected to the input/output I/F 30. The digitized imaging data is image data indicating the image for combination 24, and is stored in the storage 40 after being subjected to various types of processing by the processor 38.

It should be noted that, in the examples shown in FIGS. 2 and 3, the computer 32 common to the flying object 18 and the imaging device 20 is used, but the computer 32 may be configured by a first computer provided in the flying object 18 and a second computer provided in the imaging device 20. In addition, the computer 32 is mounted in the flying object 18, but may be mounted in the imaging device 20.

Figure 4:
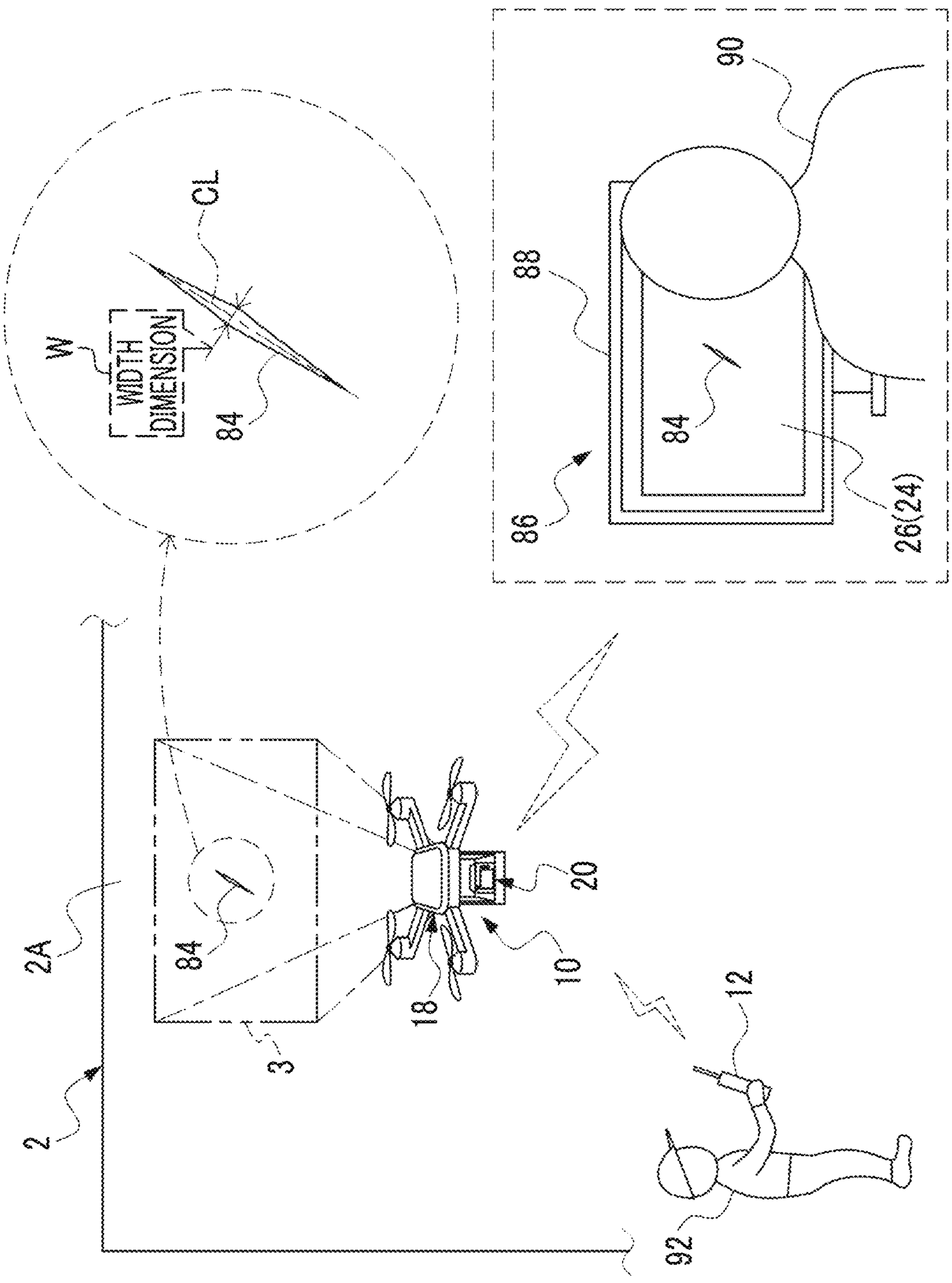
FIG. 4 is a front view showing an example of work in which an inspector inspects a wall surface based on a composite image.

FIG. 4 shows a crack 84 formed on the wall surface 2A as an example. The crack 84 is a defective part formed on the wall surface 2A. Generally, the crack 84 extends along the wall surface 2A. As shown in FIG. 4 as an example, a width dimension W represents a dimension of a width of the crack 84. The width of the crack 84 corresponds to a length of the crack 84 along a direction orthogonal to a center line CL of the crack 84.

It should be noted that, here, although the crack 84 is described as an example of the defective part, the defective part may be other than the crack 84 (for example, a loss). In addition, here, the width dimension W is described as an example, but a dimension other than the width dimension W (for example, a length dimension) may be used. In addition, here, the dimension of the width of the crack 84 is described as an example of the width dimension W, but the dimension of a part other than the crack 84 (for example, a stain generated on the wall surface 2A or a structural portion formed on the wall surface 2A) may be used. Hereinafter, as an example, the description will be made on the premise that the defective part is the crack 84. The crack 84 is an example of a "specific part" and a "defective part" according to the present disclosed technology. The width dimension W is an example of a "dimension" according to the present disclosed technology.

In a case in which the imaging target region 3 includes the crack 84, the crack 84 is included as an image in the images for combination 24 obtained by imaging the imaging target region 3. In the example shown in FIG. 4, the composite image 26 generated based on the images for combination 24 is displayed on a display device 88 of a server device 86 that is communicably connected to the flight imaging device 10. For example, an inspector 90 performs the inspection of the wall surface 2A based on the composite image 26 displayed on the display device 88. In work of inspecting the wall surface 2A based on the composite image 26, the inspector 90 specifies the width dimension W based on, for example, a scale or the like (not shown) shown in the composite image 26. It should be noted that the width dimension W may be specified by executing the image processing on the composite image 26 in the server device 86.

In order to specify the width dimension W based on the composite image 26, pixel resolution is required to be pixel resolution capable of specifying the width dimension W based on the composite image 26. The pixel resolution refers to a size of a visual field per pixel of the image sensor 56. Here, in a case in which the pixel resolution is increased, the number of captured images is increased by the increased pixel resolution, so that the work efficiency in an inspection site in which the target object 2 is provided is decreased. On the other hand, in a case in which the pixel resolution is decreased, the number of captured images is decreased by the decreased pixel resolution, but it is difficult to specify the width dimension W based on the composite image 26. Therefore, it is desirable that the pixel resolution is set to a lower limit value of the pixel resolution (hereinafter, referred to as a "lower limit value of the pixel resolution") capable of specifying the width dimension W based on the composite image 26.

However, for example, in a case in which an operator 92 (that is, an operator who operates the flight imaging device 10 using the transmitter 12) who performs work at the inspection site does not have knowledge of setting the pixel resolution, it is difficult to set the lower limit value of the pixel resolution (specifically, to derive a focal length corresponding to the lower limit value of the pixel resolution). Therefore, in the present embodiment, the processor 38 performs recommended focal length derivation processing described later in order to derive the focal length corresponding to the lower limit value of the pixel resolution.

Figure 5:
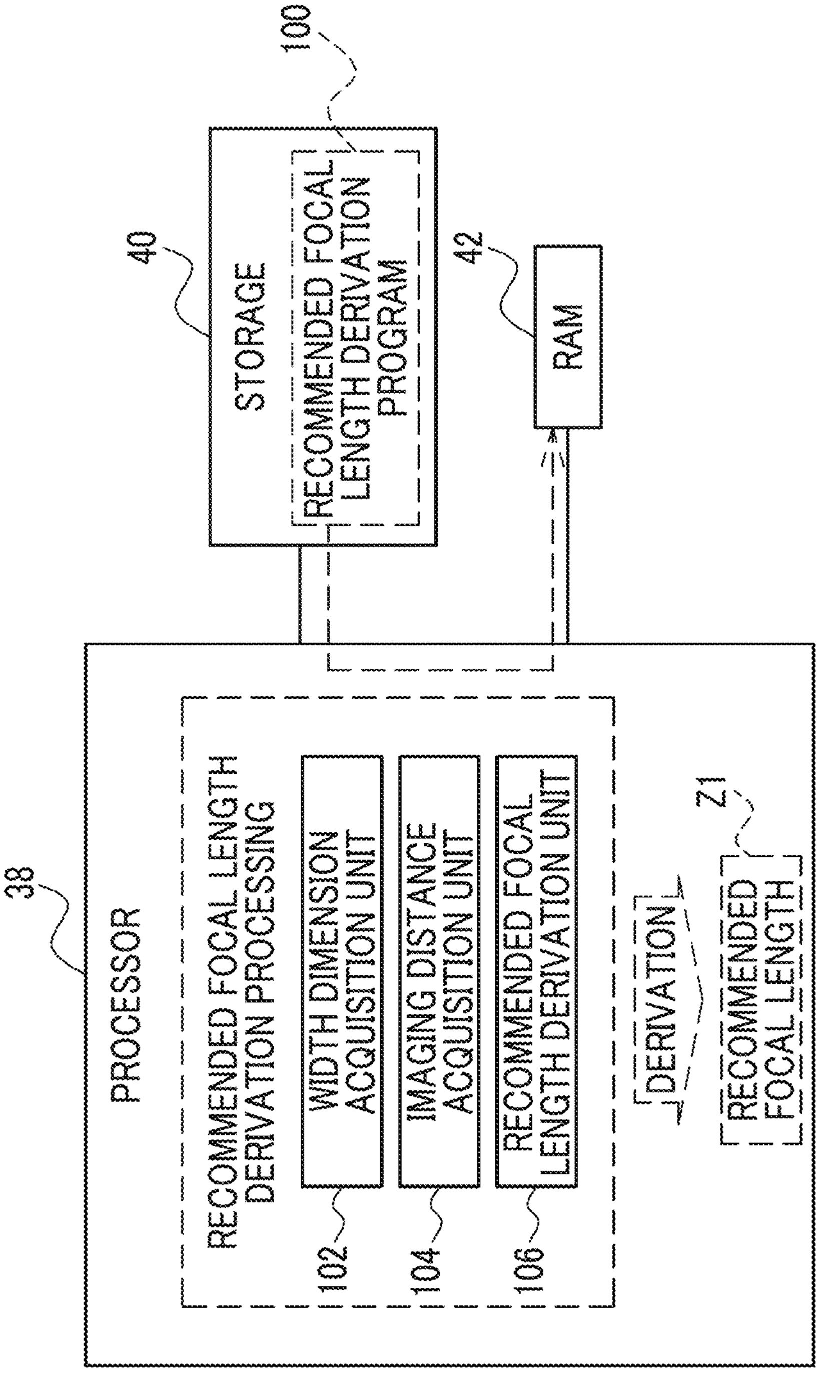
FIG. 5 is a block diagram showing an example of a functional configuration for implementing recommended focal length derivation processing.

As shown in FIG. 5 as an example, the storage 40 stores a recommended focal length derivation program 100. The processor 38 reads out the recommended focal length derivation program 100 from the storage 40, and executes the readout recommended focal length derivation program 100 on the RAM 42. The processor 38 performs recommended focal length derivation processing of deriving the focal length corresponding to the lower limit value of the pixel resolution (that is, a recommended focal length Z1 that is recommended for the zoom lens 64) in accordance with the recommended focal length derivation program 100 executed on the RAM 42.

The recommended focal length derivation processing is implemented by the processor 38 operating as a width dimension acquisition unit 102, an imaging distance acquisition unit 104, and a recommended focal length derivation unit 106 in accordance with the recommended focal length derivation program 100.

Figure 6:
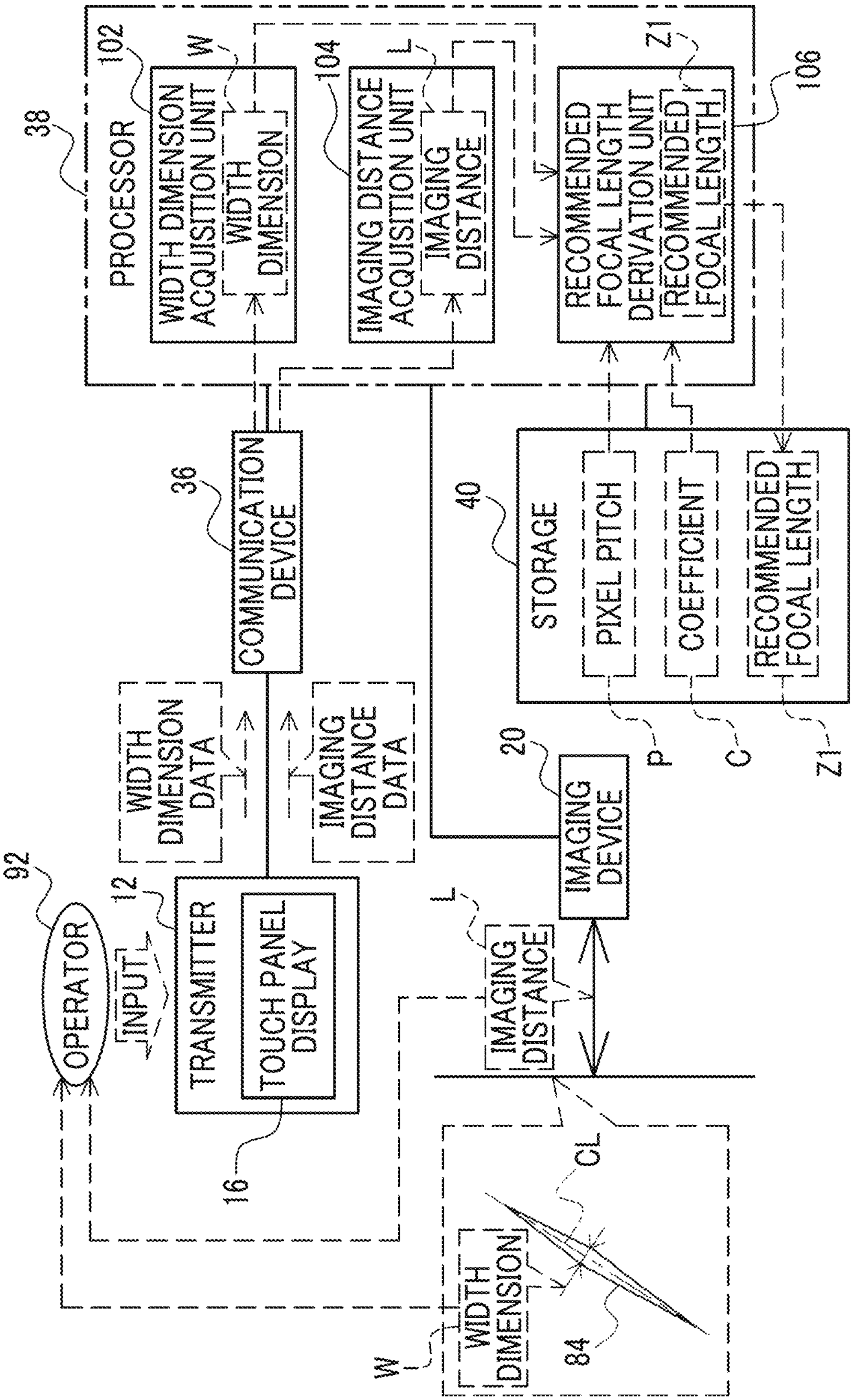
FIG. 6 is a block diagram showing an example of an aspect in which the recommended focal length derivation processing is executed by a processor.

As shown in FIG. 6 as an example, the operator 92 checks the crack 84 at the inspection site and decides on the width dimension W. The operator 92 may decide on the width dimension W based on a result of visual observation, or may decide on the width dimension W based on a result of measurement using various measurement devices (for example, a caliper, an optical crack meter, or a camera). The operator 92 may optionally decide on the width dimension W. For example, the width dimension W may be a maximum width, a minimum width, or an average width. In addition, in general, the width dimension W of the crack 84 is changed depending on a position of the crack 84 in a length direction (that is, a direction along the center line CL). The width dimension W may be a width dimension of any part of the crack 84 in the length direction. In a case in which the width dimension W is decided on, the operator 92 inputs the width dimension W to the touch panel display 16 of the transmitter 12.

In a case in which the width dimension W is received by the touch panel display 16, the transmitter 12 transmits width dimension data indicating the width dimension W to the communication device 36 of the flight imaging device 10. Here, an example is described in which, in a case in which the operator 92 inputs the width dimension W to the touch panel display 16, the width dimension data indicating the width dimension W is transmitted to the communication device 36, but, for example, measurement data obtained by measuring the width dimension W via the measurement device may be transmitted to the communication device 36 as the width dimension data.

The width dimension acquisition unit 102 acquires the width dimension W based on the width dimension data received by the communication device 36. It should be noted that, in a case in which a reception device (not shown) is provided in the flight imaging device 10, the operator 92 may directly apply the width dimension W to the reception device of the flight imaging device 10 without going through the transmitter 12. Further, in this case, the width dimension acquisition unit 102 may acquire the width dimension W received by the reception device. In addition, for example, in a case in which the flight imaging device 10 (see FIG. 1) flies on the flight route, the width dimension W may be detected by executing the image processing on the captured image obtained by being captured by the imaging device 20, and the width dimension acquisition unit 102 may acquire the detected width dimension W.

In addition, the operator 92 inputs an imaging distance L to the touch panel display 16 of the transmitter 12. The imaging distance Lis a distance between the wall surface 2A and the imaging device 20. The imaging distance L input by the operator 92 is a longest value of the imaging distance assumed in the inspection work. In a case in which the imaging distance Lis received by the touch panel display 16, the transmitter 12 transmits imaging distance data indicating the imaging distance L to the communication device 36 of the flight imaging device 10.

The imaging distance acquisition unit 104 acquires the imaging distance L based on the imaging distance data received by the communication device 36. It should be noted that, in a case in which a reception device (not shown) is provided in the flight imaging device 10, the operator 92 may directly apply the imaging distance L to the reception device of the flight imaging device 10 without going through the transmitter 12. Further, in this case, the imaging distance acquisition unit 104 may acquire the imaging distance L received by the reception device. In addition, for example, in a case in which the flight imaging device 10 flies on the flight route, the imaging distance acquisition unit 104 may acquire the imaging distance L based on the distance measurement data obtained by being measured by the distance measurement sensor 46 (see FIG. 2). The imaging distance Lis an example of an "imaging distance" according to the present disclosed technology.

The storage 40 stores a pixel pitch P of the image sensor 56 (see FIG. 3) and a coefficient C. The pixel pitch P corresponds to a distance between centers of adjacent pixels among the plurality of pixels (not shown) included in the photoelectric conversion element 80 of the image sensor 56. The adjacent pixels refer to pixels adjacent to each other in a vertical direction or a horizontal direction of the photoelectric conversion element 80. The pixel pitch Pis an example of a "pixel pitch" according to the present disclosed technology.

The coefficient C is a coefficient predetermined for each subject. The coefficient C is a coefficient for deciding on the lower limit value of the pixel resolution. For example, in a case in which the width dimension W is specified based on the composite image 26, in a case in which the number of pixels corresponding to the width dimension W (hereinafter, referred to as the "number of pixels") is required to be equal to or greater than a positive real number N, the coefficient C is set to the real number N.

In addition, the coefficient C may be decided on based on the resolution characteristics of the lens device 54. For example, whether or not the inspector 90 can specify the crack 84 having a standard width dimension W based on the composite image 26 may be examined while changing the imaging distance L, a limit width dimension W that can be specified by the visual check of the inspector 90 with respect to the number of pixels may be calculated for each lens device 54, and the maximum value among the calculated multiples may be used as the coefficient C.

The recommended focal length derivation unit 106 derives a recommended focal length Z1 that is recommended for the zoom lens 64 based on the width dimension W acquired by the width dimension acquisition unit 102, the imaging distance L acquired by the imaging distance acquisition unit 104, the pixel pitch P stored in the storage 40, and the coefficient C stored in the storage 40. The recommended focal length Z1 is an example of a "recommended focal length" according to the present disclosed technology. Specifically, the recommended focal length Z1 is derived by Equation (1).

$$Z = L \times P / W \times C \quad (1)$$

The recommended focal length Z1 is, for example, a lower limit value of the focal length that is recommended for the zoom lens 64. The recommended focal length Z1, which is derived by the recommended focal length derivation unit 106, is stored in the storage 40.

As described above, by executing the recommended focal length derivation processing, the recommended focal length Z1, which is the focal length corresponding to the lower limit value of the pixel resolution, is derived. The lower limit value of the pixel resolution is the lower limit value of the pixel resolution capable of specifying the width dimension W based on the composite image 26 even in a case in which the imaging distance Lis set to the longest value of the imaging distance assumed in the inspection work.

In a state in which the flight imaging device 10 is moving, the shake occurs in the subject image formed on the photoelectric conversion element 80. In addition, for example, in a case in which the inspection site is a dark place such as below a bridge girder or inside a tunnel, an image quality of the composite image 26 is improved by increasing the exposure time. On the other hand, in a case in which the exposure time is increased, the shake amount of the subject image is increased by the increase in the exposure time. Therefore, in the present embodiment, the processor 38 performs exposure time derivation processing described later in order to derive an upper limit value of the exposure time (hereinafter, referred to as an "upper limit value of the exposure time") at which the composite image 26 in which the width dimension W can be specified is obtained.

Figure 7:
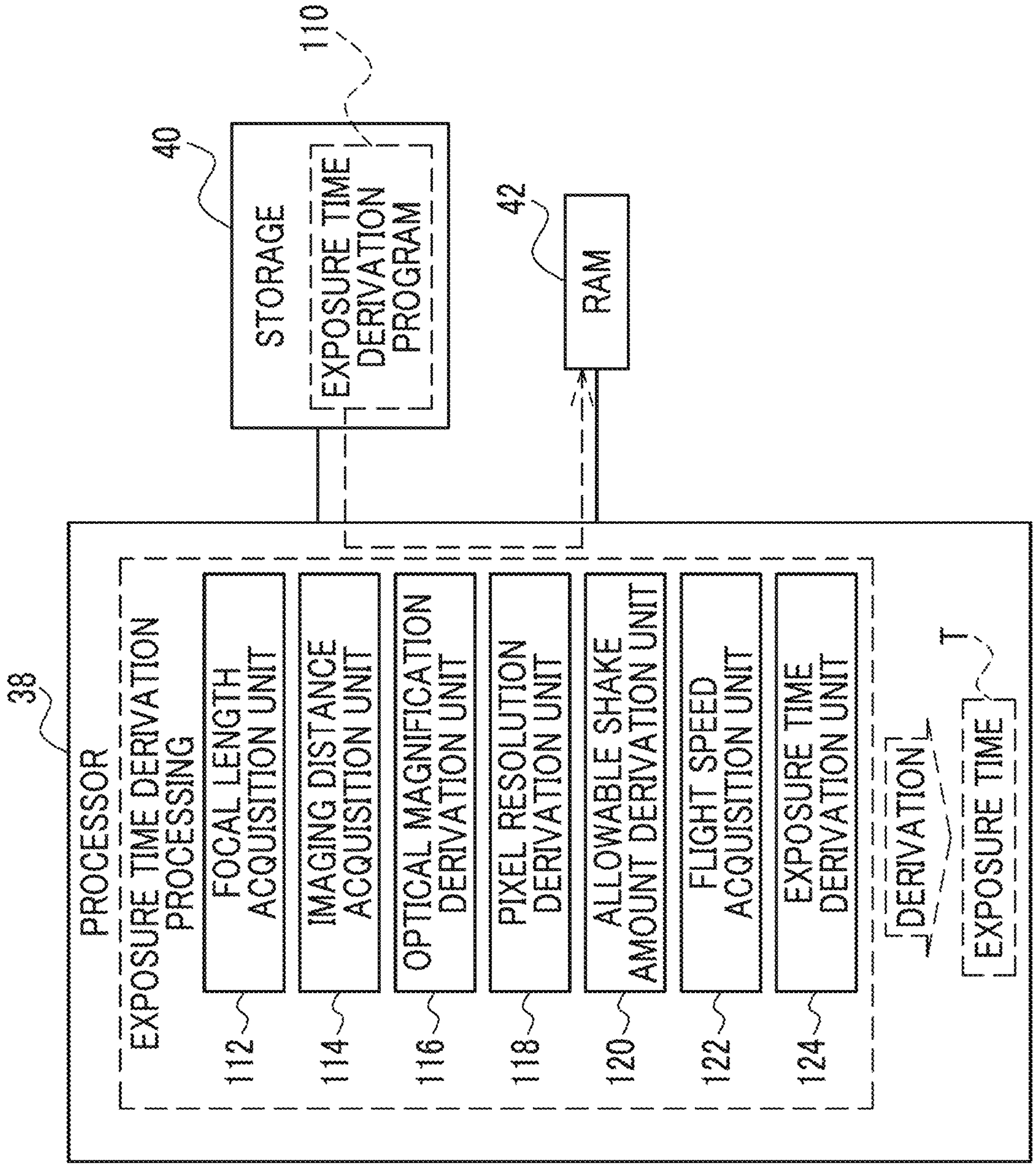
FIG. 7 is a block diagram showing an example of a functional configuration for implementing exposure time derivation processing.

As shown in FIG. 7 as an example, the storage 40 stores an exposure time derivation program 110. The processor 38 reads out the exposure time derivation program 110 from the storage 40, and executes the readout exposure time derivation program 110 on the RAM 42. The processor 38 performs exposure time derivation processing of deriving an exposure time T, which is the upper limit value of the exposure time, in accordance with the exposure time derivation program 110 executed on the RAM 42.

The exposure time derivation processing is implemented by the processor 38 operating as a focal length acquisition unit 112, an imaging distance acquisition unit 114, an optical magnification derivation unit 116, a pixel resolution derivation unit 118, an allowable shake amount derivation unit 120, a flight speed acquisition unit 122, and an exposure time derivation unit 124 in accordance with the exposure time derivation program 110. The exposure time derivation processing is executed in a case in which each imaging target region 3 is imaged by the imaging device 20 in a state in which the flight imaging device 10 is flying on the flight route.

Figure 8:
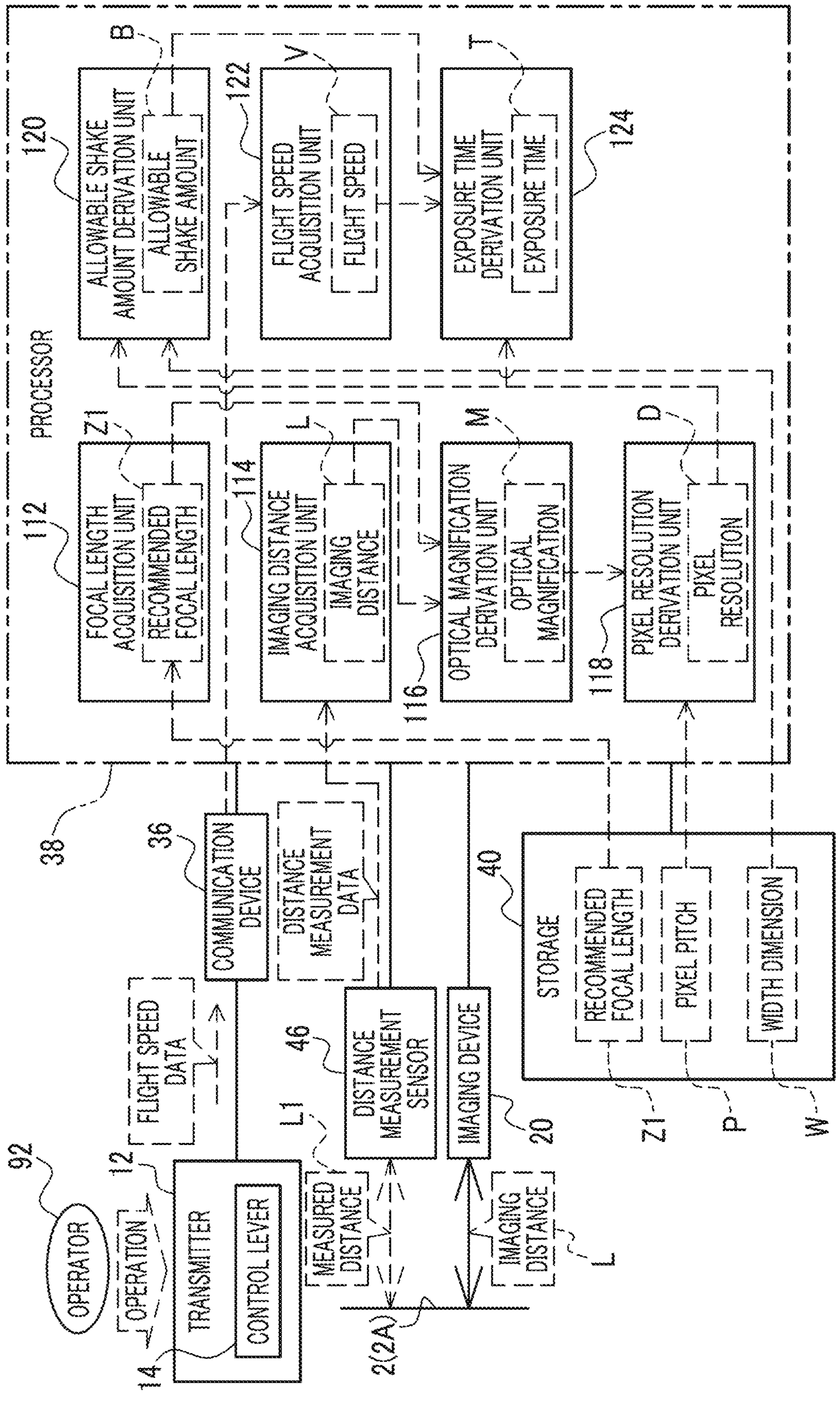
FIG. 8 is a block diagram showing an example of an aspect in which the exposure time derivation processing is executed by the processor.

As shown in FIG. 8 as an example, the focal length acquisition unit 112 acquires the recommended focal length Z1 stored in the storage 40. The recommended focal length Z1 is the focal length derived by the recommended focal length derivation processing (see FIGS. 5 and 6) described above.

The imaging distance acquisition unit 114 acquires a distance (hereinafter, referred to as a "measured distance L1") between the wall surface 2A and the distance measurement sensor 46 based on the distance measurement data obtained by the measurement via the distance measurement sensor 46. Then, the imaging distance acquisition unit 114 acquires the imaging distance L by deriving the imaging distance L, which is the distance between the wall surface 2A and the imaging device 20, from the measured distance L1 based on, for example, a conversion formula stored in the storage 40.

The optical magnification derivation unit 116 derives an optical magnification M based on the recommended focal length Z1 acquired by the focal length acquisition unit 112 and the imaging distance L acquired by the imaging distance acquisition unit 114. Specifically, the optical magnification M is derived by Equation (2).

$$M = Z / L \quad (2)$$

The pixel resolution derivation unit 118 derives pixel resolution D based on the pixel pitch P stored in the storage 40 and the optical magnification M derived by the optical magnification derivation unit 116. The pixel resolution D corresponding to the recommended focal length Z1 corresponds to the lower limit value of the pixel resolution. The pixel resolution D is an example of "pixel resolution" according to the present disclosed technology. Specifically, the pixel resolution D is derived by Equation (3).

$$D = P / M \quad (3)$$

The allowable shake amount derivation unit 120 derives a shake amount (hereinafter, referred to as an "allowable shake amount B") that is allowable for the subject image formed on the image sensor 56 in a state in which the flight imaging device 10 is flying. The allowable shake amount B is an example of a "shake amount that is allowable" according to the present disclosed technology. The allowable shake amount B is determined based on the width dimension W, the pixel resolution D, and the coefficient α. Specifically, the allowable shake amount B is derived by Equation (4).

$$B = \alpha \times W / D \quad (4)$$

The coefficient α is a coefficient indicating a degree of influence of an error allowable for the width dimension W. For example, in a case in which the width dimension W including the error allowable for the width dimension W is set as an allowable width dimension W1, the coefficient α is determined based on the width dimension W and the allowable width dimension W1. Specifically, the coefficient α is derived by Equation (5).

$$\alpha = W1 / W \quad (5)$$

For example, in a case in which the width dimension W is 1 mm, the pixel resolution D is 1 mm/pixel, and the allowable width dimension W1 is 2 mm that is twice the width dimension W, the coefficient α is 2. In addition, for example, in a case in which the width dimension W is 1 mm, the pixel resolution D is 0.5 mm/pixel, and the allowable width dimension W1 is 2 mm that is twice the width dimension W, the coefficient α is 4.

The allowable width dimension W1 may be input to the touch panel display 16 (see FIG. 1) of the transmitter 12 by the operator 92. Then, the allowable shake amount derivation unit 120 may acquire the allowable width dimension W1 based on the data input from the transmitter 12 to the communication device 36. Further, a multiple of the allowable width dimension W1 to the width dimension W may be stored in the storage 40. The allowable shake amount derivation unit 120 may derive the allowable width dimension W1 based on the width dimension W and the multiple stored in the storage 40.

It should be noted that, here, the allowable shake amount B is derived by Equation (4), but the allowable shake amount B may be derived based on a table (not shown) stored in the storage 40 in advance. The table may be a table that defines a relationship among the allowable shake amount B, the width dimension W, and the pixel resolution D. In addition, the table may be defined based on an experiment result.

Further, here, the target of the allowable shake amount B is the subject image (that is, the optical image), but may be an electronic image (that is, the captured image) corresponding to the subject image. That is, the allowable shake amount B may be a shake amount that is allowable for the captured image obtained by being captured by the image sensor 56.

The operator 92 operates the control lever 14 of the transmitter 12 with an operation amount corresponding to a flight speed V of the flight imaging device 10. The transmitter 12 transmits flight speed data indicating the flight speed V (that is, an instruction signal for indicating the flight speed V) to the communication device 36 of the flight imaging device 10 in accordance with the operation amount of the control lever 14.

The flight speed acquisition unit 122 acquires the flight speed V based on the flight speed data received by the communication device 36. Here, although an example is described in which the flight speed data indicating the flight speed Vis transmitted to the communication device 36 in a case in which the operator 92 operates the control lever, for example, in a case in which the flight imaging device 10 flies on the flight route, the flight speed V may be derived based on data obtained by measurement along a positioning sensor (not shown) and/or an acceleration sensor (not shown) mounted in the flight imaging device 10. The flight speed acquisition unit 122 may acquire the derived flight speed V. The flight speed V is an example of a "moving speed" according to the present disclosed technology.

The exposure time derivation unit 124 derives the exposure time T based on the flight speed V acquired by the flight speed acquisition unit 122, the pixel resolution D derived by the pixel resolution derivation unit 118, and the allowable shake amount B derived by the allowable shake amount derivation unit 120. The exposure time T is an example of an "exposure time" according to the present disclosed technology. Specifically, the exposure time T is derived by Equation (6).

$$T = 1/(V/(D \times B)) \quad (6)$$

As described above, the exposure time T, which is the upper limit value of the exposure time, is derived by executing the exposure time derivation processing. Then, in a case in which the flight imaging device 10 flies on the flight route and the imaging target region 3 is imaged by the imaging device 20, the exposure time for the image sensor 56 is controlled to the exposure time T.

Even in a case in which the flight route in which the imaging distance L is constant is set, the imaging distance L may fluctuate due to the action of a disturbance such as wind on the flight imaging device 10 in a case in which the flight imaging device 10 flies. Therefore, in a case in which the imaging target region 3 is imaged by the imaging device 20, it is required that the focal length of the zoom lens 64 is set to the focal length corresponding to the imaging distance L. Therefore, in the present embodiment, the processor 38 performs zoom control processing described later in order to set the focal length of the zoom lens 64 to the focal length corresponding to the imaging distance L.

Figure 9:
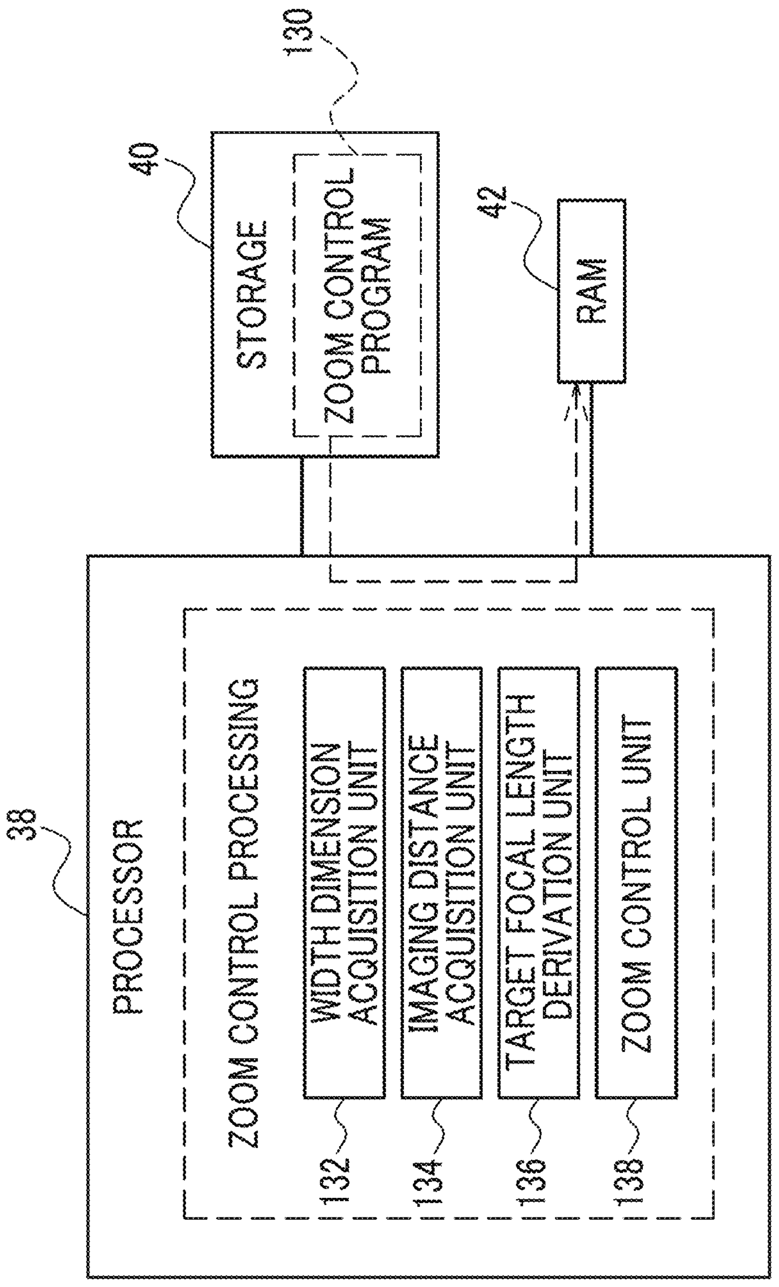
FIG. 9 is a block diagram showing an example of a functional configuration for implementing zoom control processing.

As shown in FIG. 9 as an example, the storage 40 stores a zoom control program 130. The processor 38 reads out the zoom control program 130 from the storage 40, and executes the readout zoom control program 130 on the RAM 42. The processor 38 performs zoom control processing of controlling the focal length of the zoom lens 64 to the focal length corresponding to the imaging distance L in accordance with the zoom control program 130 executed on the RAM 42.

The zoom control processing is implemented by the processor 38 operating as a width dimension acquisition unit 132, an imaging distance acquisition unit 134, a target focal length derivation unit 136, and a zoom control unit 138 in accordance with the zoom control program 130. The zoom control processing is executed in a case in which each imaging target region 3 is imaged by the imaging device 20 while the flight imaging device 10 flies on the flight route.

Figure 10:
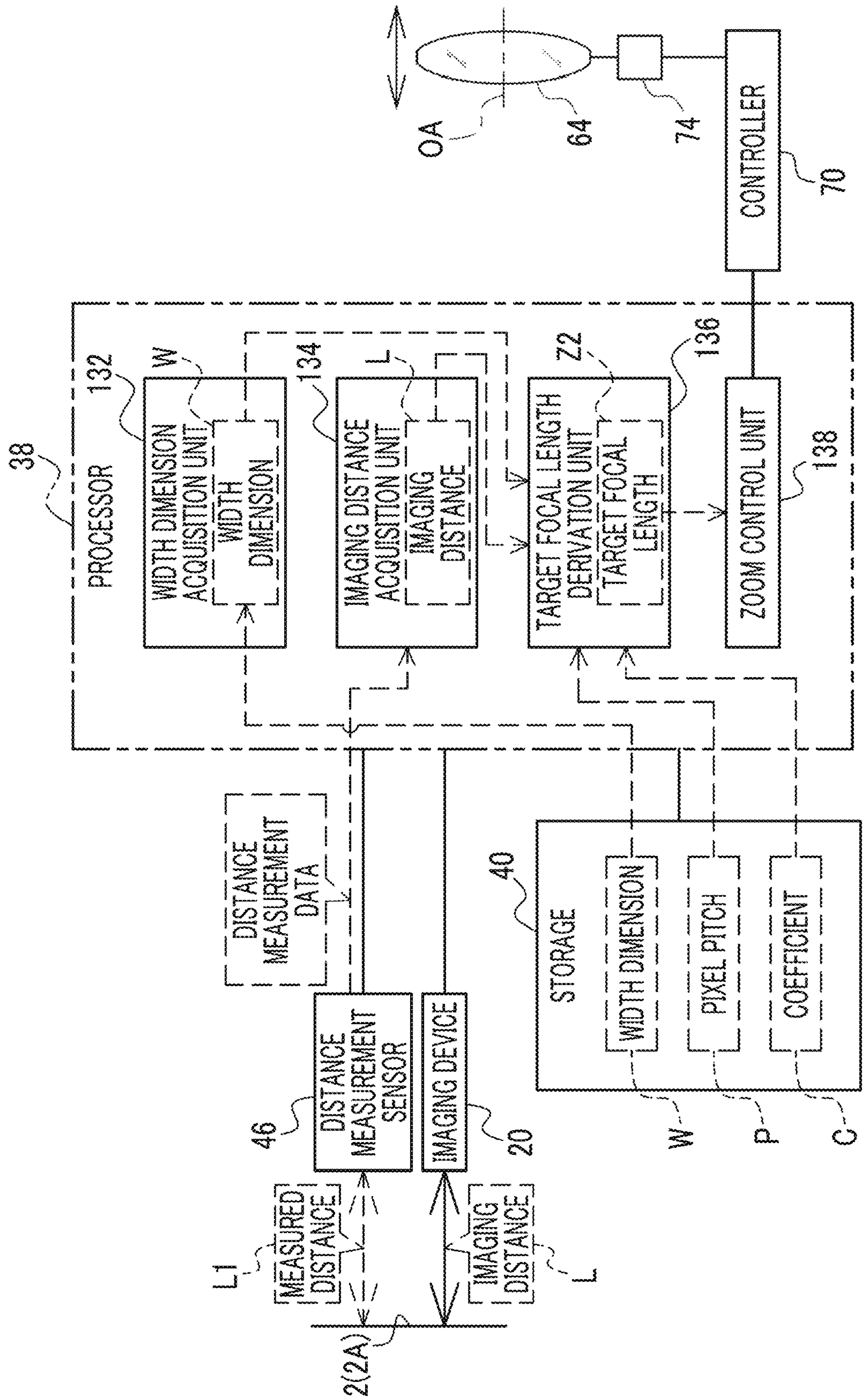
FIG. 10 is a block diagram showing an example of an aspect in which the zoom control processing is executed by the processor.

As shown in FIG. 10 as an example, the width dimension acquisition unit 132 acquires the width dimension W stored in the storage 40. The width dimension W is the width dimension W acquired by the width dimension acquisition unit 102 (see FIG. 6).

The imaging distance acquisition unit 134 acquires the measured distance L1 based on the distance measurement data obtained by being measured by the distance measurement sensor 46. Then, the imaging distance acquisition unit 134 acquires the imaging distance L by deriving the imaging distance L, which is the distance between the wall surface 2A and the imaging device 20, from the measured distance L1 based on, for example, the conversion formula stored in the storage 40.

The target focal length derivation unit 136 derives a focal length (hereinafter, referred to as a "target focal length Z2") that is targeted for the zoom lens 64 based on the width dimension W acquired by the width dimension acquisition unit 132, the imaging distance L acquired by the imaging distance acquisition unit 134, the pixel pitch P stored in the storage 40, and the coefficient C stored in the storage 40. The target focal length Z2 corresponds to a focal length corresponding to the imaging distance L. The target focal length Z2 is an example of a "target focal length" according to the present disclosed technology. Specifically, the target focal length Z2 is derived by Equation (7).

$$Z2 = L \times P / W \times C \quad (7)$$

It should be noted that, in a case in which the target focal length Z2 is less than the recommended focal length Z1, notification data indicating that the target focal length Z2 is less than the recommended focal length Z1 may be output from the flight imaging device 10 to the transmitter 12.

Then, in a case in which the notification data is received, the transmitter 12 may issue notification to the operator 92 by using sound and/or light. In addition, in a case in which the target focal length Z2 is less than the recommended focal length Z1, the flight imaging device 10 may perform the notification to the operator 92 by using sound and/or light.

The zoom control unit 138 sets the focal length of the zoom lens 64 to the target focal length Z2 by performing zoom control of moving the zoom lens 64 based on the target focal length Z2 derived by the target focal length derivation unit 136. Specifically, the zoom control is to control the zoom actuator 74 via the controller 70 to move the zoom lens 64 along the optical axis OA. As a result, the focal length of the zoom lens 64 is set to the focal length corresponding to the imaging distance L. The recommended focal length derivation program 100, the exposure time derivation program 110, and the zoom control program 130 are examples of a "program" according to the present disclosed technology.

Figure 11:
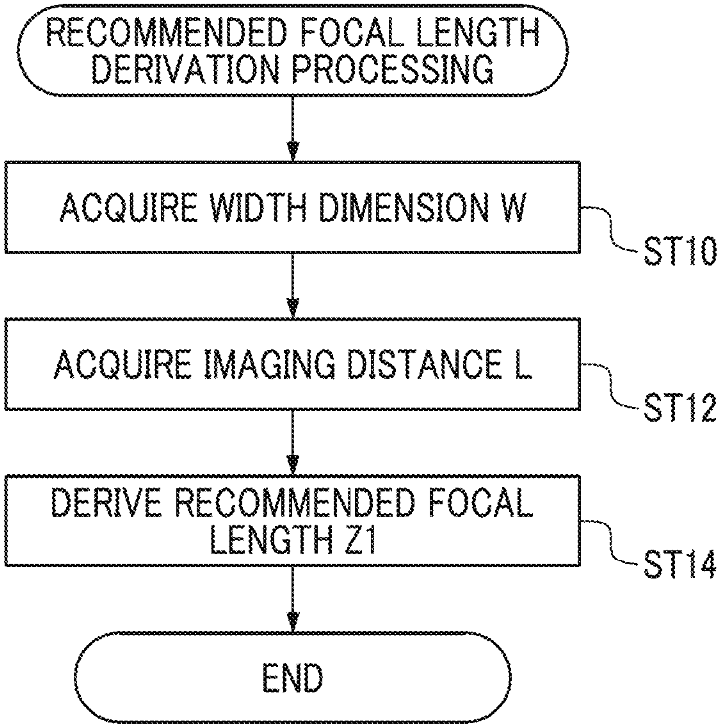
FIG. 11 is a flowchart showing an example of a flow of the recommended focal length derivation processing.

Next, an operation of the flight imaging device 10 according to the present embodiment will be described. First, the recommended focal length derivation processing will be described. FIG. 11 shows an example of a flow of the recommended focal length derivation processing according to the present embodiment.

In the recommended focal length derivation processing shown in FIG. 11, first, in step ST10, the width dimension acquisition unit 102 acquires the width dimension W, based on the width dimension data received by the communication device 36 (see FIG. 6). After the processing of step ST10 is executed, the recommended focal length derivation processing proceeds to step ST12.

In step ST12, the imaging distance acquisition unit 104 acquires the imaging distance L based on the imaging distance data received by the communication device 36 (see FIG. 6). After the processing of step ST12 is executed, the recommended focal length derivation processing proceeds to step ST14.

In step ST14, the recommended focal length derivation unit 106 derives the recommended focal length Z1 recommended for the zoom lens 64 based on the width dimension W acquired in step ST10, the imaging distance L acquired in step ST12, the pixel pitch P stored in the storage 40, and the coefficient C stored in the storage 40 (see FIG. 6). The storage 40 stores the derived recommended focal length Z1. The recommended focal length derivation processing ends after the processing of step ST12 is executed.

Figure 12:
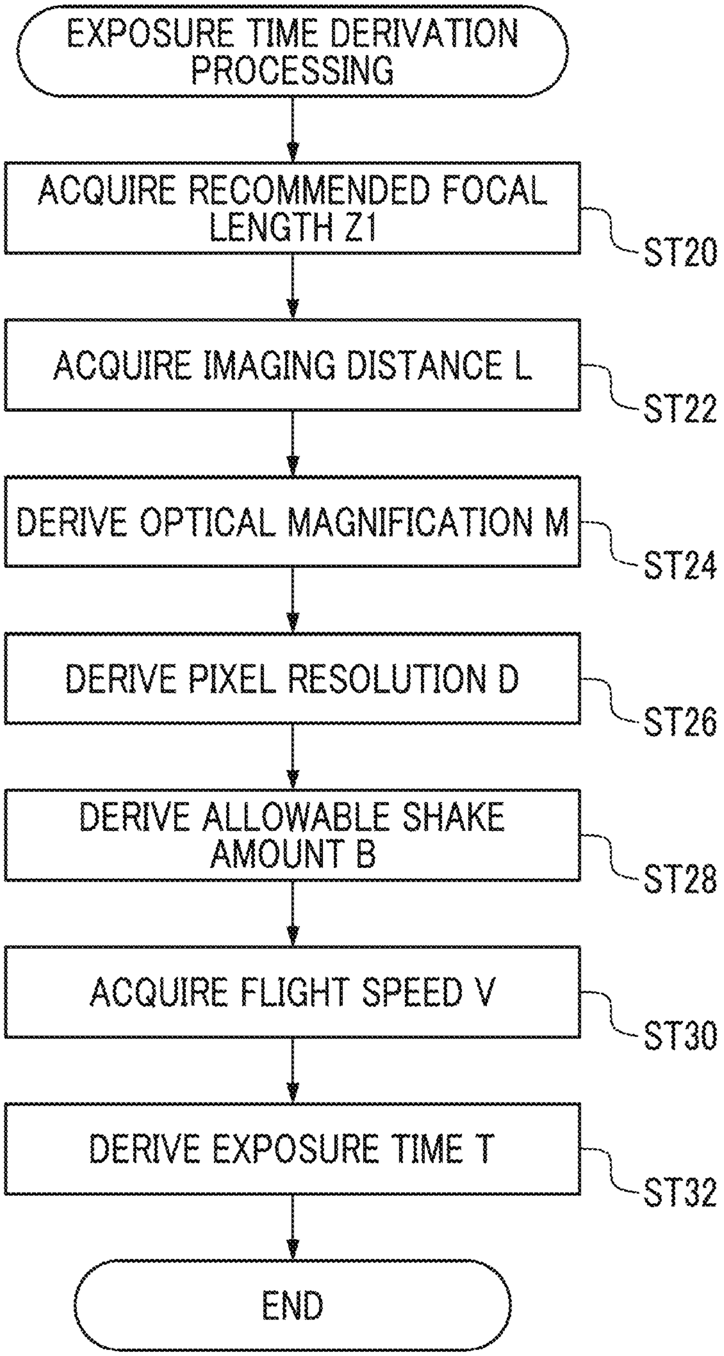
FIG. 12 is a flowchart showing an example of a flow of the exposure time derivation processing.

Hereinafter, the exposure time derivation processing will be described. FIG. 12 shows an example of a flow of the exposure time derivation processing according to the present embodiment.

In the exposure time derivation processing shown in FIG. 12, first, in step ST20, the focal length acquisition unit 112 acquires the recommended focal length Z1 stored in the storage 40 (see FIG. 8). After the processing of step ST20 is executed, the exposure time derivation processing proceeds to step ST22.

In step ST22, the imaging distance acquisition unit 114 acquires the measured distance L1 based on the distance measurement data obtained by being measured by the distance measurement sensor 46. Then, the imaging distance acquisition unit 114 acquires the imaging distance L by deriving the imaging distance L from the measured distance L1 based on, for example, the conversion formula stored in the storage 40 (see FIG. 8). After the processing of step ST22 is executed, the exposure time derivation processing proceeds to step ST24.

In step ST24, the optical magnification derivation unit 116 derives the optical magnification M based on the recommended focal length Z1 acquired in step ST20 and the imaging distance L acquired in step ST22 (see FIG. 8). After the processing of step ST24 is executed, the exposure time derivation processing proceeds to step ST26.

In step ST26, the pixel resolution derivation unit 118 derives the pixel resolution D based on the pixel pitch P stored in the storage 40 and the optical magnification M derived in step ST24 (see FIG. 8). After the processing of step ST26 is executed, the exposure time derivation processing proceeds to step ST28.

In step ST28, the allowable shake amount derivation unit 120 derives the allowable shake amount B based on the width dimension W stored in the storage 40 and the pixel resolution D derived in step ST26 (see FIG. 8). After the processing of step ST28 is executed, the exposure time derivation processing proceeds to step ST30.

In step ST30, the flight speed acquisition unit 122 acquires the flight speed V based on the flight speed data received by the communication device 36 (see FIG. 8). After the processing of step ST30 is executed, the exposure time derivation processing proceeds to step ST32.

In step ST32, the exposure time derivation unit 124 derives the exposure time T based on the flight speed V acquired in step ST30, the pixel resolution D derived in step ST26, and the allowable shake amount B derived in step ST28. The exposure time derivation processing ends after the processing of step ST32 is executed.

Figure 13:
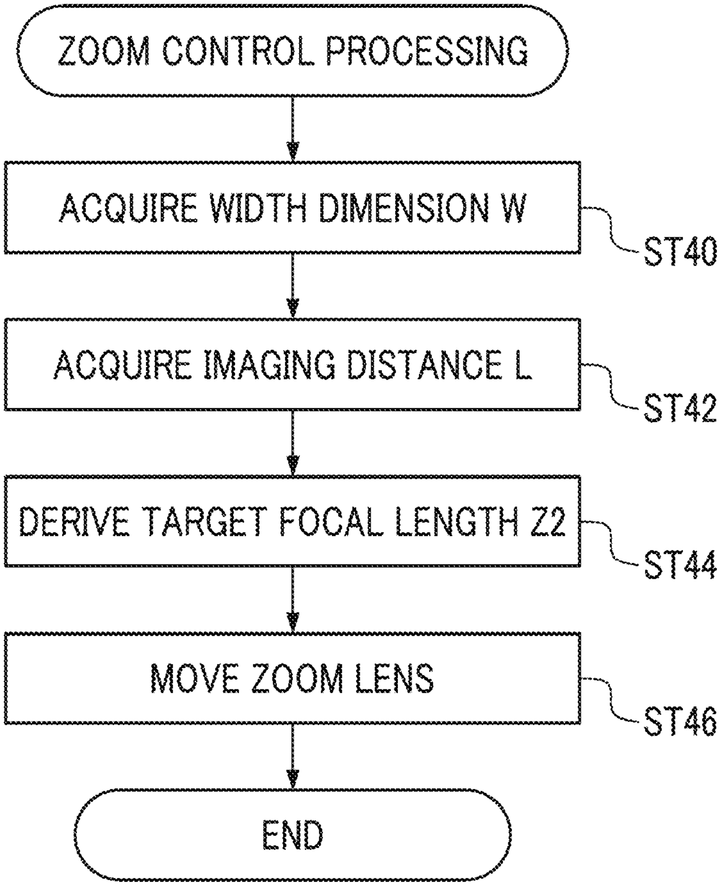
FIG. 13 is a flowchart showing an example of a flow of the zoom control processing.

Hereinafter, the zoom control processing will be described. FIG. 13 shows an example of a flow of the zoom control processing according to the present embodiment.

In the zoom control processing shown in FIG. 13, first, in step ST40, the width dimension acquisition unit 132 acquires the width dimension W stored in the storage 40 (see FIG. 10). After the processing of step ST40 is executed, the zoom control processing proceeds to step ST42.

In step ST42, the imaging distance acquisition unit 134 acquires the measured distance L1 based on the distance measurement data obtained by being measured by the distance measurement sensor 46. Then, the imaging distance acquisition unit 134 acquires the imaging distance L by deriving the imaging distance L from the measured distance L1 based on, for example, the conversion formula stored in the storage 40 (see FIG. 10). After the processing of step ST42 is executed, the zoom control processing proceeds to step ST44.

In step ST44, the target focal length derivation unit 136 derives the target focal length Z2 based on the width dimension W acquired in step ST40, the imaging distance L acquired in step ST42, the pixel pitch P stored in the storage 40, and the coefficient C stored in the storage 40 (see FIG. 10). After the processing of step ST44 is executed, the zoom control processing proceeds to step ST46.

In step ST46, the zoom control unit 138 performs the zoom control of moving the zoom lens 64 based on the target focal length Z2 derived in step ST44, to set the focal length of the zoom lens 64 to the target focal length Z2. The zoom control processing ends after the processing of step ST46 is executed. It should be noted that the imaging support method described as the operation of the flight imaging device 10 corresponds to an imaging support method of supporting imaging performed by the imaging device 20. The imaging support method is an example of an "imaging support method" according to the present disclosed technology.

As described so far, in the recommended focal length derivation processing according to the present embodiment, the processor 38 derives the recommended focal length Z1 recommended for the zoom lens 64 based on the width dimension W, the pixel pitch P of the image sensor 56, and the imaging distance L (see FIG. 6). Therefore, for example, even in a case in which the operator 92 who performs work at the inspection site does not have knowledge of setting the pixel resolution, the recommended focal length Z1, which is the focal length corresponding to the lower limit value of the pixel resolution, can be obtained.

In addition, in the exposure time derivation processing according to the present embodiment, the processor 38 derives the allowable shake amount B that is allowed for the subject image formed on the image sensor 56 in a state in which the flight imaging device 10 is flying, based on the width dimension W and the pixel resolution D. Then, the processor 38 derives the exposure time T based on the flight speed V of the flight imaging device 10 and the allowable shake amount B. Therefore, it is possible to set an appropriate exposure time T corresponding to the width dimension W, as compared to a case in which the exposure time T is set regardless of the width dimension W.

In addition, since the exposure time T corresponding to the width dimension W can be set, the exposure time to the image sensor 56 can be secured as compared to a case in which the exposure time T is set regardless of the width dimension W. That is, in other words, it is not necessary to set the exposure time for the image sensor 56 to be shorter than the exposure time T.

Moreover, the ISO sensitivity can be decreased to the extent that the exposure time for the image sensor 56 can be secured. As a result, it is possible to obtain the composite image 26 with less noise than in a case in which the exposure time for the image sensor 56 is shorter than the exposure time T.

In addition, the pixel resolution D is the pixel resolution determined based on the pixel pitch P of the image sensor 56, the recommended focal length Z1, and the imaging distance L. Therefore, the exposure time T can be derived by using the pixel resolution D (that is, the lower limit value of the pixel resolution) corresponding to the recommended focal length Z1.

In the exposure time derivation processing according to the present embodiment, the exposure time T is derived based on the recommended focal length Z1 derived in the recommended focal length derivation processing. Therefore, the exposure time T can be derived with higher accuracy than in a case in which the exposure time T is derived based on the focal length different from the recommended focal length Z1.

In addition, the lens device 54 includes the zoom lens 64 of which the focal length can be changed. Therefore, unlike a case in which the lens device 54 includes the fixed focus lens, the focal length can be set to the recommended focal length Z1 derived by the recommended focal length derivation processing.

In addition, in the zoom control processing according to the present embodiment, the processor 38 derives the target focal length Z2 that is targeted for the zoom lens 64 based on the width dimension W, the pixel pitch P of the image sensor 56, and the imaging distance L. Then, the zoom control of moving the zoom lens 64 is performed to set the focal length of the zoom lens 64 to the target focal length Z2. Therefore, even in a case in which the imaging distance L fluctuates due to the action of a disturbance such as wind on the flight imaging device 10 in a case in which the flight imaging device 10 flies, the focal length of the zoom lens 64 can be set to the focal length corresponding to the imaging distance L in a case in which the imaging target region 3 is imaged by the imaging device 20.

Further, the width dimension W is a dimension indicating the width of the crack 84. Accordingly, the inspector 90 can specify the dimension of the width of the crack 84 by checking the composite image 26 in the work of inspecting the wall surface 2A based on the composite image 26.

It should be noted that, in the above-described embodiment, the imaging device 20 comprises the lens device 54 including the zoom lens 64, but the imaging device 20 may be configured as follows.

Figure 14:
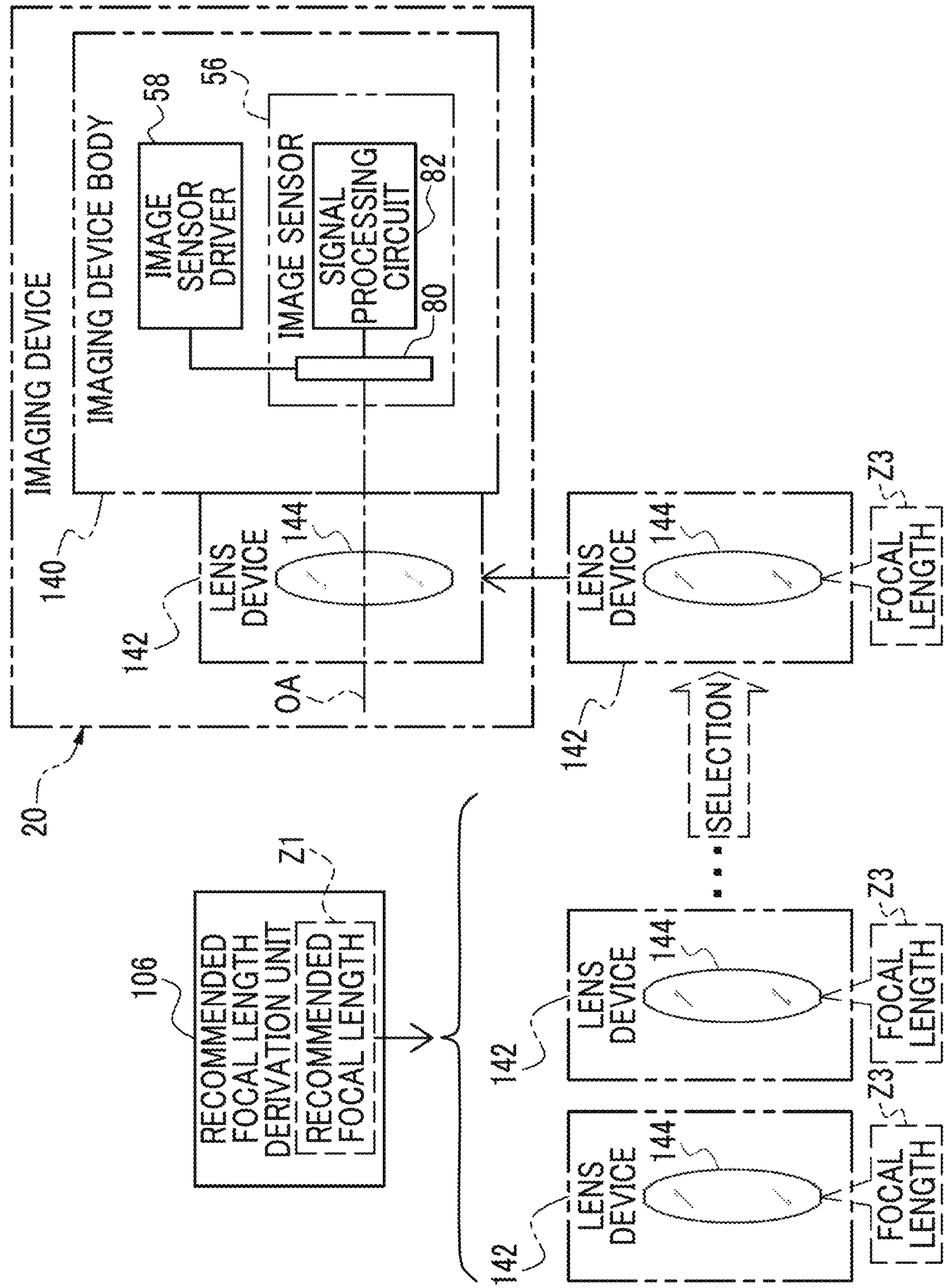
FIG. 14 is a block diagram showing an example of an imaging device according to a first modification example comprising an interchangeable lens device.

As shown in FIG. 14 as an example, the imaging device 20 comprises an imaging device body 140 and a lens device 142. The imaging device body 140 includes the image sensor 56, the image sensor driver 58, and the like. The lens device 142 is configured to be interchangeable with the imaging device body 140. The lens device 142 comprises a fixed focus lens 144. The fixed focus lens 144 is an example of an "imaging lens" and a "fixed focus lens" according to the present disclosed technology. A plurality of types of lens devices 142 are prepared for the imaging device 20 with respect to the imaging device body 140. The fixed focus lenses 144 provided in the respective lens devices 142 have focal lengths Z3 different from each other.

In the example shown in FIG. 14, the lens device 142 of any one of the plurality of types of lens devices 142 is selected by the user or the like based on the recommended focal length Z1 derived by the recommended focal length derivation unit 106. Here, the focal length Z3 of the fixed focus lens 144 provided in each lens device 142 may not match the recommended focal length Z1, and in this case, the lens device 142 having the fixed focus lens 144 having the shortest focal length Z3 among the fixed focus lenses 144 having the focal length Z3 equal to or longer than the recommended focal length Z1 is selected from among the plurality of types of lens devices 142.

According to the example shown in FIG. 14, even in a case in which the operator 92 who performs work in the inspection site does not have knowledge of setting the pixel resolution, the fixed focus lens 144 having the focal length Z3 corresponding to the lower limit value of the pixel resolution can be selected.

Figure 15:
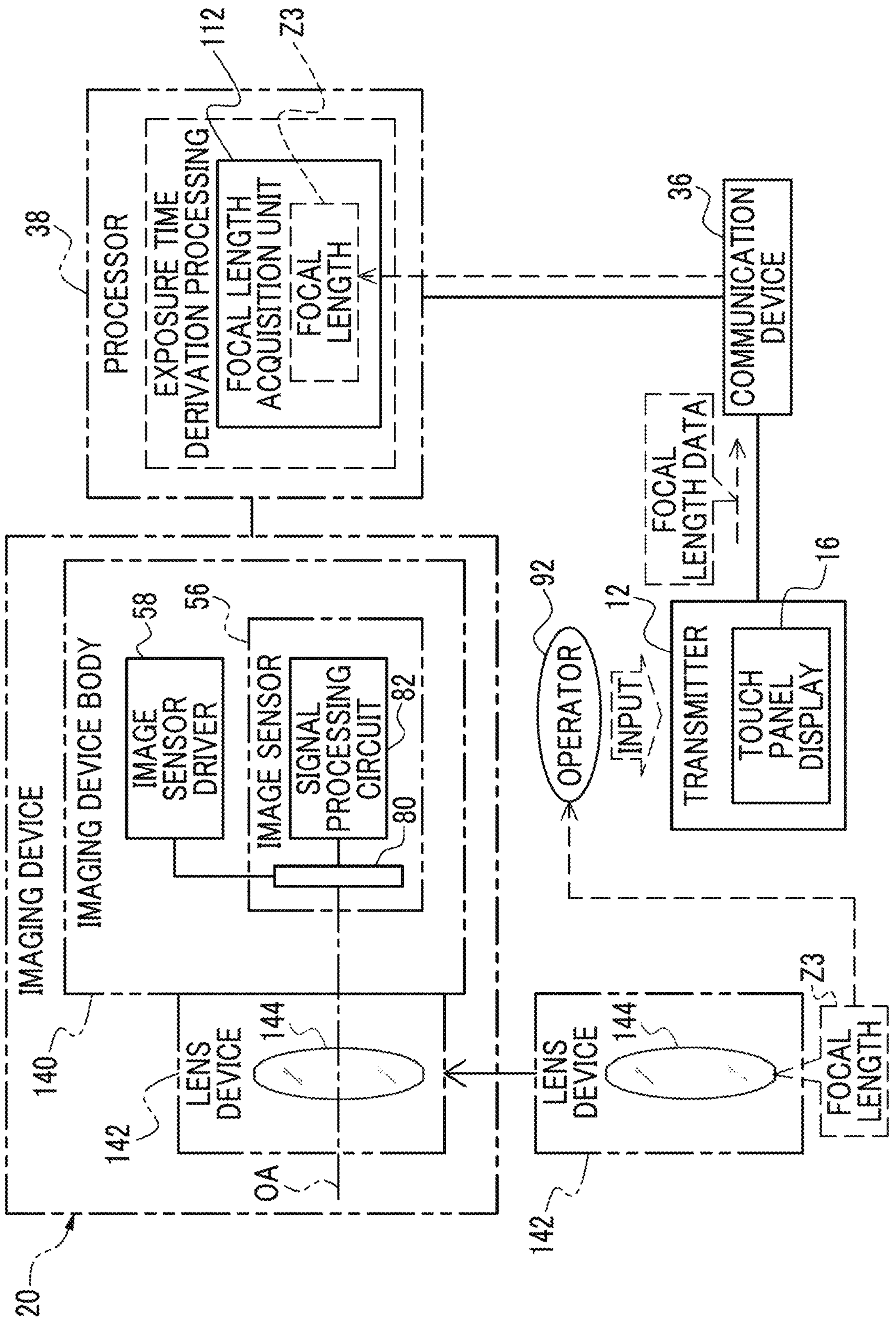
FIG. 15 is a block diagram showing an example of an operation of a focal length acquisition unit in a case in which the imaging device according to the first modification example is used.

In addition, as shown in FIG. 15 as an example, in a case in which the lens device 142 is interchangeable, the focal length acquisition unit 112 may acquire the focal length Z3 of the fixed focus lens 144 in the following manner. In the example shown in FIG. 15, in a case in which the lens device 142 is selected, the operator 92 inputs the focal length Z3 of the fixed focus lens 144 to the touch panel display 16 of the transmitter 12. The focal length Z3 input by the operator 92 is a known focal length for each fixed focus lens 144.

In a case in which the focal length Z3 is received on the touch panel display 16, the transmitter 12 transmits focal length data indicating the focal length Z3 to the communication device 36. The focal length acquisition unit 112 acquires the focal length Z3 based on the focal length data received by the communication device 36.

It should be noted that, in a case in which the reception device (not shown) is provided in the flight imaging device 10, the operator 92 may directly apply the focal length Z3 to the reception device of the flight imaging device 10 without going through the transmitter 12. Further, in this case, the focal length acquisition unit 112 may acquire the focal length Z3 received by the reception device.

In addition, in a case in which the focal length Z3 of each lens device 142 is stored in a storage device (not shown) provided in the lens device 142, and the lens device 142 is attached to the imaging device body 140, the focal length acquisition unit 112 may acquire the focal length Z3 stored in the storage device. In a case in which the focal length Z3 is acquired by the focal length acquisition unit 112 in this way, the focal length Z3 is used instead of the recommended focal length Z1 in the exposure time derivation processing.

In addition, in the above-described embodiment, the allowable shake amount derivation unit 120 derives the allowable shake amount B based on the width dimension W and the pixel resolution D (see FIG. 8). However, the allowable shake amount derivation unit 120 may derive the allowable shake amount B in the following manner.

Figure 16:
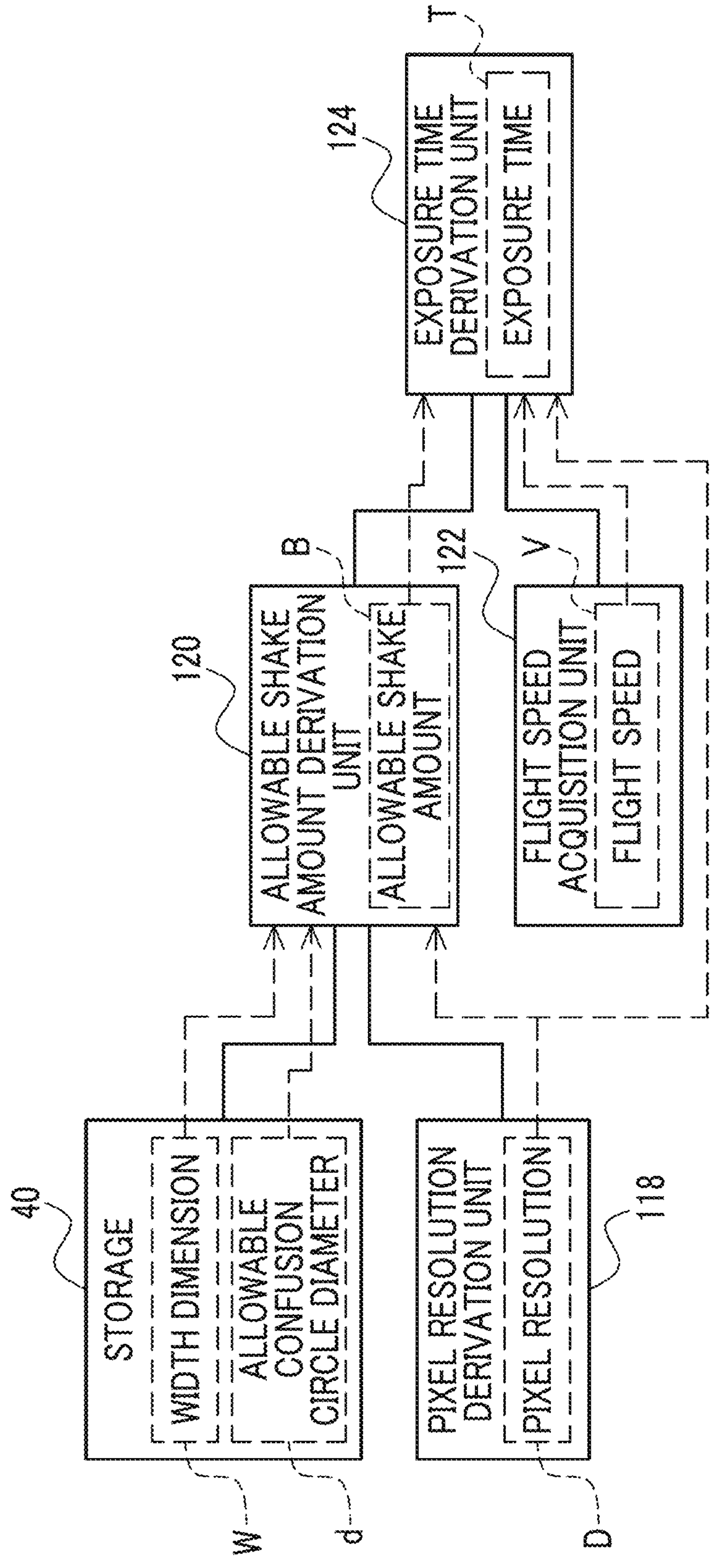
FIG. 16 is a block diagram showing an example of an operation of an exposure time derivation unit according to a second modification example.

As shown in FIG. 16 as an example, the allowable shake amount derivation unit 120 derives the allowable shake amount B based on the width dimension W, the pixel resolution D, and an allowable confusion circle diameter d stored in the storage 40. The storage 40 stores the allowable confusion circle diameter d in the storage 40 in advance. The allowable confusion circle diameter d corresponds to the blurriness amount of the zoom lens 64 (see FIG. 3). That is, the blurriness amount of the zoom lens 64 is the blurriness amount determined based on the allowable confusion circle diameter d. The allowable confusion circle diameter d is an example of an "allowable confusion circle diameter" according to the present disclosed technology. Specifically, the allowable shake amount B is derived by Equation (8).

$$B=\alpha\times W/D+\beta\times d \tag{8}$$

The coefficient α is as described above. A coefficient β is a coefficient indicating a degree of influence of the blurriness amount of the zoom lens 64. For example, the user visually checks the crack 84 included as an image in the composite image 26 obtained by using the zoom lens 64, and thus the coefficient β corresponding to the blurriness amount of the crack 84 is decided on. In order to obtain the composite image 26 in which the width dimension W can be specified, it is required to set the allowable shake amount B to be smaller as the blurriness amount is larger. Accordingly, the coefficient β is defined by a negative value. The coefficient β is a coefficient indicating the influence of the blurriness of the confusion circle on the appearance of the crack 84, and depends on the distribution of the blurriness of the confusion circle. Even in a case in which the allowable confusion circle diameter d is the same, in a case of the confusion circle in which the blurriness is uniformly spread and there is no peak, the image of the crack 84 is uniformly spread, so that an absolute value of the coefficient β is increased. On the other hand, in a case of the confusion circle having a peak at the center of the blurriness, the shape of the image of the crack 84 is less likely to be broken, and thus the absolute value of the coefficient β is small.

It should be noted that, here, the allowable shake amount B is derived by Equation (8), but the allowable shake amount B may be derived based on a table (not shown) stored in the storage 40 in advance. The table may be a table that defines a relationship among the allowable shake amount B, the width dimension W, the pixel resolution D, and the allowable confusion circle diameter d. In addition, the table may be defined based on an experiment result.

In the example shown in FIG. 16, the exposure time derivation unit 124 derives the exposure time T based on the flight speed V acquired by the flight speed acquisition unit 122, the pixel resolution D derived by the pixel resolution derivation unit 118, and the allowable shake amount B derived by the allowable shake amount derivation unit 120.

According to the example shown in FIG. 16, since the allowable shake amount B is derived based on the blurriness amount (that is, the allowable confusion circle diameter d) of the zoom lens 64, the exposure time T corresponding to the blurriness amount of the zoom lens 64 can be obtained.

In addition, in the above-described embodiment, the recommended focal length derivation processing is executed by the flight imaging device 10, but may be executed by an external device (hereinafter, referred to as an "external device") connected to the flight imaging device 10 in a communicable manner. The external device may be the transmitter 12 or another device. Then, the recommended focal length Z1 obtained by the recommended focal length derivation processing may be provided from the external device to the flight imaging device 10. Similarly, the exposure time derivation processing may also be executed by the external device, and the exposure time T obtained by the exposure time derivation processing may be provided from the external device to the flight imaging device 10.

In addition, in the above-described embodiment, the target focal length Z2 is derived by the flight imaging device 10, but may be derived by the external device. Then, the target focal length Z2 may be applied from the external device to the flight imaging device 10.

In addition, in the above-described embodiment, the flight imaging device 10 is described as an example of the moving object, but any moving object may be used as long as the moving object moves on a movement route. Examples of the moving object may include a car, a motorcycle, a bicycle, a cart, a gondola, an airplane, a flying object, and a ship.

In addition, in the above-described embodiment, the imaging device 20 images the imaging target region 3 in order to obtain the image for combination 24, but may image the imaging target region 3 for a purpose other than obtaining the images for combination 24.

In addition, in the above-described embodiment, the processor 38 is described as an example, but at least one other CPU, at least one GPU, and/or at least one TPU may be used instead of the processor 38 or together with the processor 38.

In addition, in the above-described embodiment, the form example is described in which the recommended focal length derivation program 100, the exposure time derivation program 110, and the zoom control program 130 are stored in the storage 40, but the present disclosed technology is not limited to this. For example, at least any one program (hereinafter, simply referred to as a "program") of the recommended focal length derivation program 100, the exposure time derivation program 110, or the zoom control program 130 may be stored in a portable non-transitory computer-readable storage medium (hereinafter, simply referred to as a "non-transitory storage medium") such as an SSD or a USB memory. The program stored in the non-transitory storage medium may be installed in the computer 32 of the flight imaging device 10.

In addition, the program may be stored in a storage device of another computer, server device, or the like connected to the flight imaging device 10 via a network, and the program may be downloaded in response to a request of the flight imaging device 10 and installed in the computer 32.

In addition, the storage device of another computer, server device, or the like connected to the flight imaging device 10 or the storage 40 need not store all of the programs, or may store a part of the programs.

In addition, although the flight imaging device 10 incorporates the computer 32, the present disclosed technology is not limited to this, and, for example, the computer 32 may be provided outside the flight imaging device 10.

Further, in the embodiment described above, although the computer 32 including the processor 38, the storage 40, and the RAM 42 is shown, the present disclosed technology is not limited to this, and a device including an ASIC, an FPGA, and/or a PLD may be applied instead of the computer 32. In addition, a combination of the hardware configuration and the software configuration may be used instead of the computer 32.

Further, the following various processors can be used as a hardware resource for executing the various types of processing described in the embodiment described above. Examples of the processor include a CPU which is a general-purpose processor functioning as the hardware resource for executing the various types of processing by executing software, that is, a program. Examples of the processor also include a dedicated electronic circuit as a processor having a dedicated circuit configuration specially designed to execute specific processing, such as an FPGA, a PLD, or an ASIC. Any processor includes a memory built therein or connected thereto, and any processor uses the memory to execute the various processes.

The hardware resource for executing various types of processing may be configured by one of the various processors or may be configured by a combination of two or more processors that are the same type or different types (for example, combination of a plurality of FPGAs or combination of a CPU and an FPGA). Further, the hardware resource for executing the various types of processing may be one processor.

As a configuring example of one processor, first, there is a form in which one processor is configured by a combination of one or more CPUs and software and the processor functions as the hardware resource for executing the various types of processing. Secondly, as represented by SoC, there is a form in which a processor that implements the functions of the entire system including a plurality of hardware resources for executing various types of processing with one IC chip is used. As described above, the various processes are implemented by using one or more of the various processors as the hardware resource.

Further, specifically, an electronic circuit obtained by combining circuit elements, such as semiconductor elements, can be used as the hardware structure of these various processors. In addition, the visual line detection processing described above is merely an example. Accordingly, it is needless to say that unnecessary steps may be deleted, new steps may be added, or the processing order may be changed within a range that does not deviate from the gist.

The above-described contents and the above-shown contents are detailed descriptions of portions related to the present disclosed technology and are merely examples of the present disclosed technology. For example, the description of the configuration, the function, the operation, and the effect are the description of examples of the configuration, the function, the operation, and the effect of the parts according to the present disclosed technology. Accordingly, it goes without saying that unnecessary parts may be deleted, new elements may be added, or replacements may be made with respect to the above-described contents and the above-shown contents within a range that does not deviate from the gist of the present disclosed technology. In addition, the description of, for example, common technical knowledge that does not need to be particularly described to enable the implementation of the present disclosed technology is omitted in the above-described contents and the above-shown contents in order to avoid confusion and to facilitate the understanding of the portions related to the present disclosed technology.

In the present specification, "A and/or B" is synonymous with "at least one of A or B". That is, "A and/or B" may mean only A, only B, or a combination of A and B. In addition, in the present specification, in a case in which three or more matters are associated and expressed by "and/or", the same concept as "A and/or B" is applied.

All of the documents, the patent applications, and the technical standards described in the present specification are incorporated into the present specification by reference to the same extent as in a case in which the individual documents, patent applications, and technical standards are specifically and individually stated to be described by reference.

With regard to the embodiments described above, the following supplementary note is further disclosed.

SUPPLEMENTARY NOTE 1

An imaging support device that supports imaging performed by an imaging device mounted in a moving object and including an image sensor and an imaging lens, the imaging support device comprising: a processor, in which the processor derives a recommended focal length that is recommended for the imaging lens, based on a dimension of a specific part included in a subject, a pixel pitch of the image sensor, and an imaging distance between the subject and the imaging device.

What is claimed is:

1. An imaging support device that supports imaging performed by an imaging device mounted in a moving object and including an image sensor, the imaging support device comprising:
- a processor,
- wherein the processor
  - derives a shake amount that is allowable for a subject image formed on the image sensor in a state in which the moving object is moving, based on a dimension of a specific part included in a subject and pixel resolution, and
  - derives an exposure time for the image sensor based on a moving speed of the moving object and the shake amount.

2. The imaging support device according to claim 1,
- wherein the imaging device further includes an imaging lens, and
- the pixel resolution is pixel resolution determined based on a pixel pitch of the image sensor, a focal length of the imaging lens, and an imaging distance between the subject and the imaging device.

3. The imaging support device according to claim 1,
- wherein the imaging device further includes an imaging lens, and
- the processor derives a recommended focal length that is recommended for the imaging lens, based on the dimension, a pixel pitch of the image sensor, and an imaging distance between the subject and the imaging device.

4. The imaging support device according to claim 3,
- wherein a focal length of the imaging lens is a focal length set based on the recommended focal length.

5. The imaging support device according to claim 3,
- wherein the imaging lens is a zoom lens.

6. The imaging support device according to claim 3, wherein the imaging lens is a fixed focus lens.

7. The imaging support device according to claim 1, wherein the imaging device further includes a zoom lens, the processor derives a target focal length that is targeted for the zoom lens, based on the dimension, a pixel pitch of the image sensor, and an imaging distance between the subject and the imaging device, and a focal length of the zoom lens is set to the target focal length by performing zoom control of moving the zoom lens.

8. The imaging support device according to claim 1, wherein the imaging device further includes an imaging lens, and the shake amount is derived based on a blurriness amount of the imaging lens.

9. The imaging support device according to claim 8, wherein the blurriness amount is determined based on an allowable confusion circle diameter.

10. The imaging support device according to claim 1, wherein the specific part is a defective part.

11. The imaging support device according to claim 10, wherein the defective part is a crack, and the dimension is a width dimension.

12. An imaging device mounted in a moving object, the imaging device comprising:

an image sensor; and a processor, wherein the processor derives a shake amount that is allowable for a subject image formed on the image sensor in a state in which the moving object is moving, based on a dimension of a specific part included in a subject and pixel resolution, and derives an exposure time for the image sensor based on a moving speed of the moving object and the shake amount.

13. An imaging support method of supporting imaging performed by an imaging device mounted in a moving object and including an image sensor, the imaging support method comprising:

deriving a shake amount that is allowable for a subject image formed on the image sensor in a state in which the moving object is moving, based on a dimension of a specific part included in a subject and pixel resolution; and deriving an exposure time for the image sensor based on a moving speed of the moving object and the shake amount.

14. A non-transitory computer-readable storage medium storing a program for causing a computer applied to an imaging support device that supports imaging performed by an imaging device mounted in a moving object and including an image sensor, to execute a process comprising:

deriving a shake amount that is allowable for a subject image formed on the image sensor in a state in which the moving object is moving, based on a dimension of a specific part included in a subject and pixel resolution; and deriving an exposure time for the image sensor based on a moving speed of the moving object and the shake amount.

* * * * *